(12) United States Patent
Yamanaka et al.

(10) Patent No.: US 11,624,632 B2
(45) Date of Patent: Apr. 11, 2023

(54) POSITION DETECTION DEVICE

(71) Applicant: Panasonic Intellectual Property Management Co., Ltd., Osaka (JP)

(72) Inventors: Seigo Yamanaka, Fukui (JP); Masamine Yasui, Fukui (JP); Ryo Shimada, Fukui (JP); Masahiro Mizukami, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 544 days.

(21) Appl. No.: 16/417,775

(22) Filed: May 21, 2019

(65) Prior Publication Data

US 2019/0271571 A1    Sep. 5, 2019

Related U.S. Application Data

(63) Continuation of application No. PCT/JP2017/044306, filed on Dec. 11, 2017.

(30) Foreign Application Priority Data

Dec. 14, 2016 (JP) .............................. JP2016-241949
Feb. 28, 2017 (JP) .............................. JP2017-035766
Jul. 31, 2017 (JP) .............................. JP2017-147450

(51) Int. Cl.
*G01D 5/14* (2006.01)
*F16H 59/02* (2006.01)
(Continued)

(52) U.S. Cl.
CPC ............ *G01D 5/145* (2013.01); *F16H 59/02* (2013.01); *F16H 59/0204* (2013.01);
(Continued)

(58) Field of Classification Search
CPC ..... G01D 5/145; F16H 59/02; F16H 59/0204; F16H 59/044; F16H 59/105; F16H 61/12; G01B 7/00; G05G 25/00; B60K 20/02
See application file for complete search history.

(56) References Cited

U.S. PATENT DOCUMENTS 8,829,893 B2 * 9/2014 Youngner ................ G01D 5/06
324/202
9,163,957 B2 * 10/2015 Iwata .................... F16H 59/105
(Continued)

FOREIGN PATENT DOCUMENTS

JP    2016-109292    6/2016
JP    2016-138892    8/2016

OTHER PUBLICATIONS

International Search Report of PCT application No. PCT/JP2017/044306 dated Mar. 6, 2018.
(Continued)

*Primary Examiner* — Alexander Satanovsky
*Assistant Examiner* — Lynda Dinh
(74) *Attorney, Agent, or Firm* — Seed IP Law Group LLP

(57) ABSTRACT

A position detection device includes two detection systems that are respectively fed from power supply systems different from each other, and displace together with a shift lever. Each detection system can output detection patterns with four digits. A detection pattern when being located at a given position is different from a detection pattern when being located at another position. In any detection pattern, outputs of certain two digits among the four digits are set so as to be identical to each other, and to be different from outputs of two other digits. Alternatively, outputs of certain three digits among the four digits are set to be identical to each other, and to be different from an output of another digit.

6 Claims, 24 Drawing Sheets

(51) Int. Cl.
*F16H 59/04* (2006.01)
*F16H 59/10* (2006.01)
*G05G 25/00* (2006.01)
*G01B 7/00* (2006.01)
*F16H 61/12* (2010.01)
*B60K 20/02* (2006.01)

(52) U.S. Cl.
CPC ......... *F16H 59/044* (2013.01); *F16H 59/105* (2013.01); *F16H 61/12* (2013.01); *G01B 7/00* (2013.01); *G05G 25/00* (2013.01); *B60K 20/02* (2013.01)

(56) References Cited

U.S. PATENT DOCUMENTS

| | | | |
|---|---|---|---|
| 9,765,879 B2* | 9/2017 | Takahashi | B60L 53/14 |
| 2004/0035237 A1 | 2/2004 | Matsui et al. | |
| 2010/0045272 A1* | 2/2010 | Kondo | G01D 5/145 |
| | | | 324/207.13 |
| 2013/0069635 A1* | 3/2013 | Kitamoto | G01D 5/145 |
| | | | 324/207.2 |
| 2013/0072350 A1* | 3/2013 | Ueno | F16H 59/54 |
| | | | 477/111 |
| 2014/0020495 A1 | 1/2014 | Iwata | |
| 2016/0153547 A1* | 6/2016 | Shibata | F16H 59/0204 |
| | | | 701/51 |

OTHER PUBLICATIONS

The DE Office Action dated Jan. 10, 2023 for the related DE Patent Application No. 112017006281.0. (9 pages).

* cited by examiner

FIG. 5

|   | P | R | N | D | S |
|---|---|---|---|---|---|
| P | — | 4 | 4 | 4 | 8 |
| R | 4 | — | 4 | 8 | 4 |
| N | 4 | 4 | — | 4 | 4 |
| D | 4 | 8 | 4 | — | 4 |
| S | 8 | 4 | 4 | 4 | — |

(With eight sensors)

FIG. 6
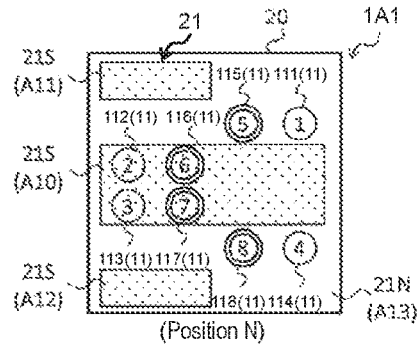
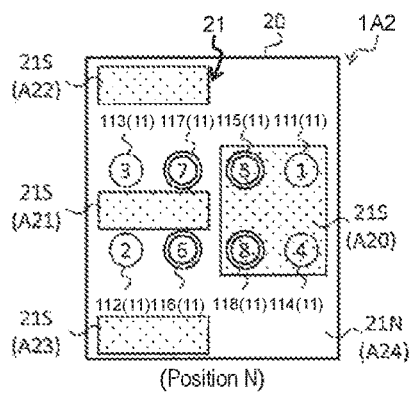
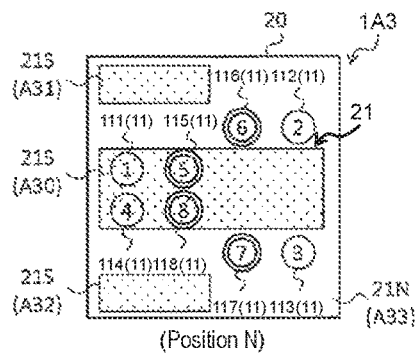
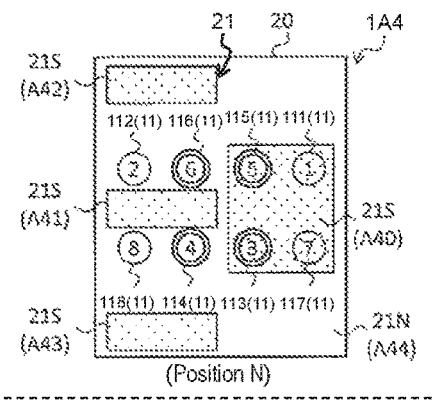

|   | 1 | 2 | 3 | 4 | 5 | 6 | 7 | 8 |
|---|---|---|---|---|---|---|---|---|
| * | ON |   |   |   | ON |   |   |   |
| H | ON | ON | ON |   | ON | ON | ON |   |
| B |   | ON |   |   |   | ON |   |   |
| R |   |   | ON |   |   |   | ON |   |
| N | ON |   | ON | ON | ON |   | ON | ON |
| D |   |   |   | ON |   |   |   | ON |

(b)

|   | * | H | B | R | N | D |
|---|---|---|---|---|---|---|
| * | – | 4 | 4 | 4 | 4 | 4 |
| H | 4 | – | 4 | 4 | 4 | 8 |
| B | 4 | 4 | – | 4 | 8 | 4 |
| R | 4 | 4 | 4 | – | 4 | 4 |
| N | 4 | 4 | 8 | 4 | – | 4 |
| D | 4 | 8 | 4 | 4 | 4 | – |

FIG. 15

|   | P | R | N | D |
|---|---|---|---|---|
| P | — | 4 | 4 | 4 |
| R | 4 | — | 4 | 4 |
| N | 4 | 4 | — | 4 |
| D | 4 | 4 | 4 | — |

(With six sensors)

(Position H)

POSITION DETECTION DEVICE

TECHNICAL

The present invention relates to a position detection device that detects a position of an operating unit including a shift lever of a vehicle.

BACKGROUND ART

For example, an automobile includes a shift device of a shift-by-wire type in which a positional displacement is electrically detected when a shift lever is operated by a driver, and a controller operates a transmission based on the positional displacement. For the shift-by-wire type, securing fail-safe has been demanded in view of failure of a power supply that feeds power to a detector (for example, a magnetic sensor). In contrast, a position sensor in which a plurality of detectors are classified into two systems, and different power supply is used for each system to secure fail-safe has been proposed (refer to PTL 1).

CITATION LIST

Patent Literature

PTL 1: Unexamined Japanese Patent Publication No. 2016-138892

SUMMARY OF THE INVENTION

An object of the present invention is to provide a position detection device that detects a position of an operating unit, which can secure fail-safe against failure of a power supply and a detector.

A position detection device according to the present invention is a position detection device that detects a position of an operating unit, and the position detection device includes a first detection system and a second detection system that are respectively fed from power supply systems different from each other, and displace between a plurality of positions up to five positions together with the operating unit, when the operating unit is displaced. Each of the first detection system and the second detection system includes four detectors each of which has a detection function with one bit that outputs one of two values that varies according to a positional relationship with a detection target unit, and therefore is capable of outputting each of plurality of detection patterns with four digits according to the plurality of positions. In any of the first detection system and the second detection system, the plurality of detection patterns when the operating unit is located at a given position among the plurality of positions are set to be different from any of the plurality of detection patterns when the operating unit is located at a position different from the given position among the plurality of positions. In any one of the plurality of detection patterns as well, outputs of certain two digits among the four digits are set to be identical to each other, and to be different from outputs of two other digits.

Alternatively, a position detection device according to the present invention includes a first detection system and a second detection system that are respectively fed from power supply systems different from each other, and displace between a plurality of positions up to eight positions together with the operating unit, when the operating unit is displaced. Each of the first detection system and the second detection system includes four detectors each of which has a detection function with one bit that outputs one of two values that varies according to a positional relationship with a detection target unit, and therefore is capable of outputting plurality of detection patterns with four digits according with the plurality of positions. In both the first detection system and the second detection system, the plurality of detection patterns when the operating unit is located at a given position among the plurality of positions are set to be different from any of the plurality of detection patterns when the operating unit is located at a position different from the given position among the plurality of positions. In any one of the plurality of detection patterns as well, outputs of certain three digits among the four digits are set to be identical to each other, and to be different from an output of another digit.

With this configuration, focusing on one detection system in any of the position detection devices, there are two or more digits whose outputs are different from each other between two predetermined detection patterns. In other words, in one detection system, a humming distance of "2" or more can be secured. Accordingly, in the one detection system, an error with one digit can be detected. The position detection device as a whole (two detection systems) can secure the humming distance of "4" or more. This can detect an error with three digits, and correct an error with one digit. Furthermore, the two detection systems are respectively fed from the power supply systems different from each other. The above-described position detection device can thus secure fail-safe against failure of a power supply and failure of a detector.

Respective detection patterns of one detection system and the other detection system when being located at an identical position may be set to be identical.

With this configuration, it is possible to simplify a configuration of the position detection device, and to reduce overall dimensions of the position detection device.

The present invention can provide a position detection device that can secure fail-safe against failure of a power supply and a detector.

BRIEF DESCRIPTION OF DRAWINGS

FIG. 5 is a table illustrating the humming distances between respective positions.

FIG. 6 is a schematic diagram of position detection devices and detection patterns according to modifications of the first exemplary embodiment.

FIG. 12 schematically illustrates detection patterns of the position detection device (part (a)), and humming distances between respective positions (part b)).

FIG. 15 is a table illustrating humming distances between respective positions.

DESCRIPTION OF EMBODIMENTS

Prior to describing exemplary embodiments of the present invention, problems found in a conventional device will be described briefly. In the case of the position sensor in PTL 1, fail-safe against failure of one power supply can be secured, but when any of detectors gets failure, an error of a detected signal cannot be detected and corrected. In other words, PTL 1 does not disclose a configuration that can secure fail-safe against failure of the detector.

Hereinafter, preferable exemplary embodiments of the present invention will be described.

First Exemplary Embodiment

Figure 1:
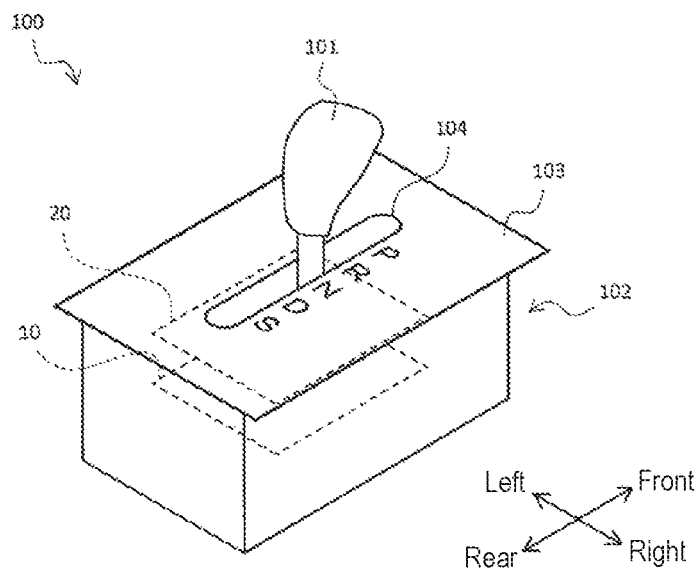
FIG. 1 is a perspective view illustrating an external configuration of a shift device applied with a position detection device according to a first exemplary embodiment of the present invention.

FIG. 1 is a perspective view illustrating an external configuration of a shift device applied with a position detection device according to a first exemplary embodiment of the present invention. As illustrated in FIG. 1, position detection device 1 can be applied to shift device 100 provided in, for example, a center console of a vehicle such as an automobile. Shift device 100 includes shift lever 101 to be operated by a driver and detection unit 102 that accommodates position detection device 1 that detects a position of shift lever 101. Shift panel 103 is provided on an upper surface of detection unit 102, and guide groove 104 is formed in shift panel 103 in a penetrating manner, to regulate an operating direction of shift lever 101.

In the first exemplary embodiment, guide groove 104 forms a straight line extending in a front-back direction, and shift lever 101 is provided to penetrate guide groove 104. Shift level 101 can displace in the front-back direction along guide groove 104. In the first exemplary embodiment, shift lever 101 can be located at five positions. Specifically, the five positions include position P, position R, position N, position D, and position S, which are disposed in this order from the front to the rear.

Board 10 is provided in detection unit 102. A plurality of magnetic sensors 11 (detectors: refer to part (a) of FIG. 3) are mounted on board 10. On the other hand, plate-shaped supporter 20 is provided at a lower part of shift lever 101 so as to face board 10 from above. Permanent magnets 21 (refer to part (a) of FIG. 3) are attached to a lower surface of supporter 20. Permanent magnets 21 are accordingly positioned so as to face magnetic sensors 11 from above.

Figure 2:
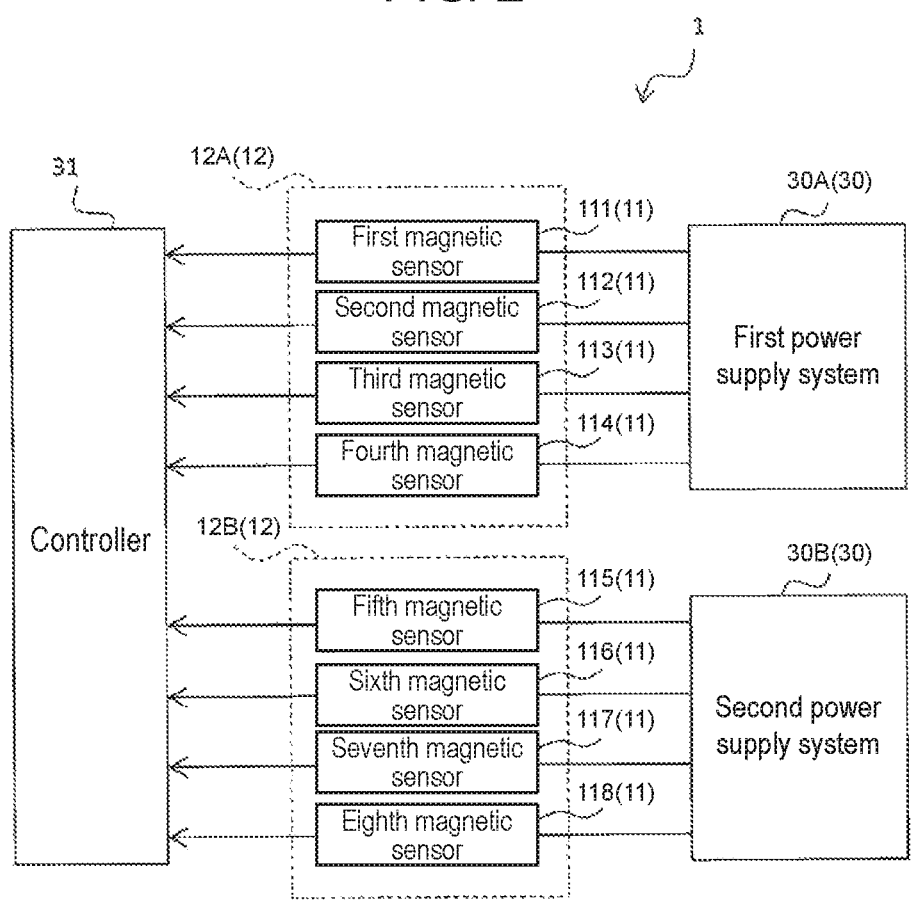
FIG. 2 is a block diagram illustrating an electrical configuration of the position detection device.

FIG. 2 is a block diagram illustrating an electrical configuration of position detection device 1. Position detection device 1 includes two detection systems 12 (12A, 12B). Each detection system 12 includes four magnetic sensors 11. Specifically, first detection system 12A includes first to fourth magnetic sensors "111 to 114" as four magnetic sensors 11, and second detection system 12B includes fifth to eighth magnetic sensors "115 to 118" as four magnetic sensors 11.

Detection systems 12 are respectively fed from power supply systems 30 (30A, 30B) different from each other. In other words, first detection system 12A is connected to first power supply system 30A, and first to fourth magnetic sensors "111 to 114" are fed from first power supply system 30A. In addition, second detection system 12B is connected to second power supply system 30B, and fifth to eighth magnetic sensors "115 to 118" are fed from second power supply system 30B. Note that first power supply system 30A and second power supply system 30B may be respectively configured with power supply circuits each including a battery, or may be respectively configured with power supply circuits that use a common battery.

Magnetic sensors 11 (first to eighth magnetic sensors "111 to 118") are connected to controller 31 including, for example, a central processing unit (CPU). Controller 31 receives outputs (detection values) of magnetic sensors 11. As will be described later, controller 31 determines the position of shift lever 101 based on the outputs from magnetic sensors 11 to appropriately drive a transmission of a vehicle.

Figure 3:
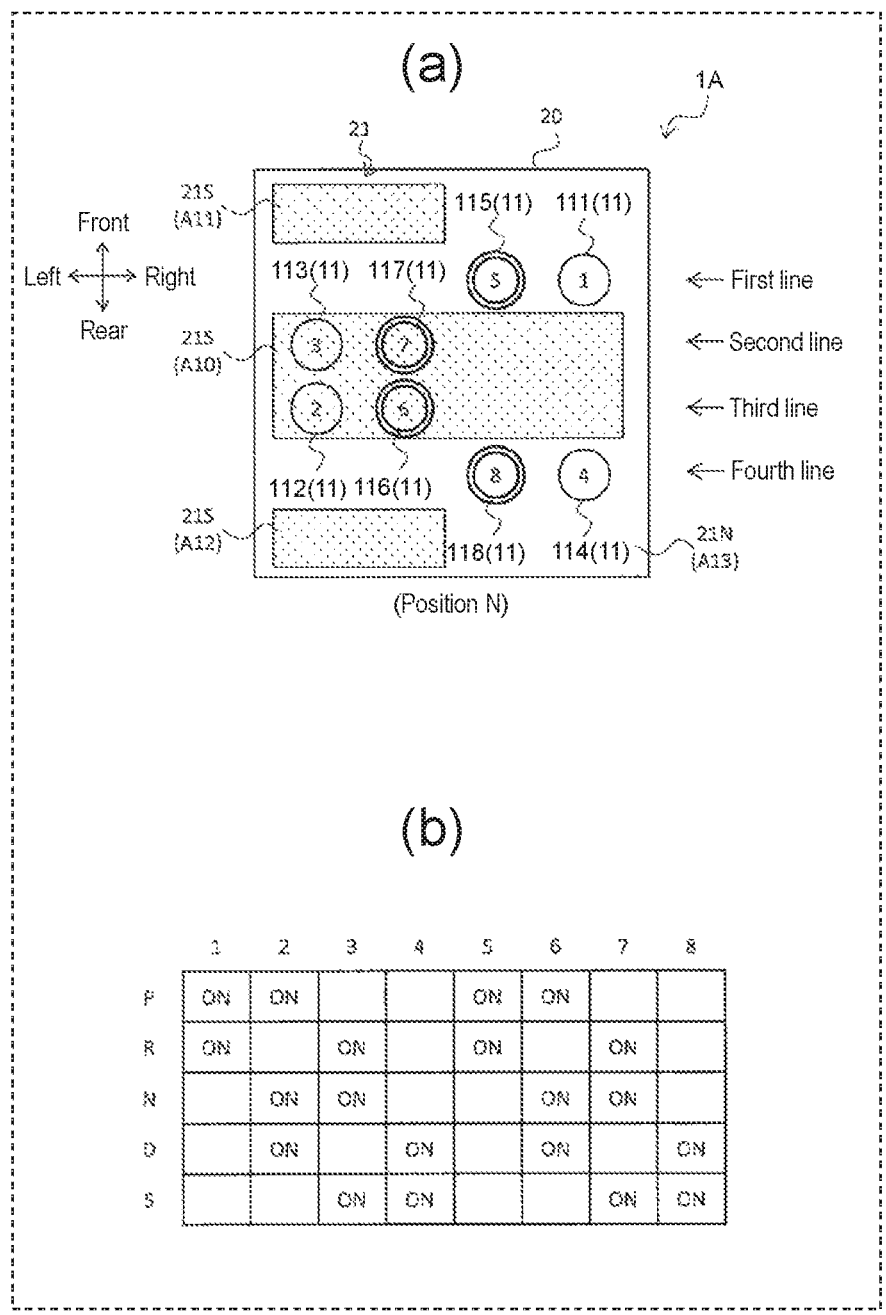
FIG. 3 illustrates a schematic configuration of the position detection device (part (a)), and a table illustrating detection patterns (part (b)).

Part (a) of FIG. 3 is a schematic diagram illustrating a configuration of position detection device 1A, and particularly illustrates a disposition of magnetic sensors 11 and permanent magnets 21, when shift lever 101 located at position N. Note that icons attached with FIGS. 1 to 4 in single circles respectively represent first to fourth magnetic sensors "111 to 114" in first detection system 12A, and icons attached with FIGS. 5 to 8 in double circles respectively represent fifth to eighth magnetic sensors "115 to 118" in second detection system 12B.

As illustrated in part (a) of FIG. 3, magnetic sensors 11 are disposed in four lines from the front to the rear. Specifically, a pair of magnetic sensors 11 (first and fifth magnetic sensors 111, 115) are disposed in a first line located foremost. For those magnetic sensors, first magnetic sensor 111 is disposed on a right side, and fifth magnetic sensor 115 is disposed on a left side. A pair of magnetic sensors 11 (third and seventh magnetic sensors 113, 117) are disposed in a second line located behind the first line. For those magnetic sensors, third magnetic sensor 113 is disposed on a left side, and seventh magnetic sensor 117 is disposed on a right side. Two magnetic sensors 11 in the second line are disposed closer to the left side so as not to overlap with two magnetic sensors 11 in the first line in the front-back direction.

A pair of magnetic sensors 11 (second and sixth magnetic sensors 112, 116) are disposed in a third line. For those magnetic sensors, second magnetic sensor 112 is disposed on a left side, and sixth magnetic sensor 116 is disposed on a right side. Two magnetic sensors 11 in the third line are disposed behind two magnetic sensors 11 in the second line so as to overlap with two magnetic sensors 11 in the second line in the front-back direction. In other words, second magnetic sensor 112 is positioned behind third magnetic sensor 113, and sixth magnetic sensor 116 is positioned behind seventh magnetic sensor 117.

A pair of magnetic sensors 11 (fourth and eighth magnetic sensors 114, 118) are disposed in a fourth line located rearmost. For those magnetic sensors, fourth magnetic sensor 114 is disposed on a right side, and eighth magnetic sensor 118 is disposed on a left side. Two magnetic sensors 11 in the fourth line are disposed behind two magnetic sensors 11 in the first line so as to positionally coincide with two sensors 11 in the first line in the right-left direction. In other words, fourth magnetic sensor 114 is positioned behind first magnetic sensor 111, and eighth magnetic sensor 118 is positioned behind fifth magnetic sensor 115.

As described above, magnetic sensors 11 are symmetrically disposed in the front-back direction while interposing a border line between the second line and the third line. As understood from FIG. 2 and part (a) of FIG. 3, magnetic sensors 11 that form each pair described above are combined so as to respectively belong to detection systems 12 different from each other.

Note that each magnetic sensor 11 is configured with, for example, a Hall integrated circuit (IC), and has a detection function with one bit that outputs one of two values according to a positional relationship with permanent magnet 21 (detection target unit). Specifically, each magnetic sensor 11 configured to detect the S pole outputs an ON signal when facing the S pole, and outputs an OFF signal when not facing the S pole. Note that each magnetic sensor 11 may be configured to detect the N pole.

On the other hand, permanent magnets 21 are formed in a pattern with a predetermined shape on the lower surface of supporter 20. Specifically, when shift lever 101 is located at position N, S magnetic pole 21S (region A10) that has an oblong band shape with a horizontally longer length is provided between the first line and the fourth line described above such that S magnetic pole 21S (region A10) positionally overlaps with all magnetic sensors 11 in the right-left direction, as illustrated in part (a) of FIG. 3. S magnetic pole 21S (region A11) that has an oblong band shape with a horizontally shorter length is provided near the front of the first line such that S magnetic pole 21S (region A11) positionally overlaps with only four magnetic sensors 11 on the left side (third, seventh, second, and sixth magnetic sensors 113, 117, 112, 116) in the right-left direction. Moreover, S magnetic pole 21S (region A12) that has an oblong band shape with a horizontally shorter length is provided near the rear of the fourth line such that S magnetic pole 21S (region A12) positionally overlaps with only four magnetic sensors 11 on the left side (third, seventh, second, and sixth magnetic sensors 113, 117, 112, 116) in the right-left direction.

Non-magnetic body having no magnetism may be present between S magnetic poles 21S provided at three places. Note that, in the first exemplary embodiment, N magnetic pole 21N (region A13) is provided at regions between respective S magnetic poles 21S to facilitate detection of S magnetic poles 21S by magnetic sensors 11, in order to clarify a border between regions of S magnetic poles 21S and other regions.

When shift lever 101 is operated in such position detection device 1A, detection patterns, with eight digits, that are different from each other are output for respective positions (that is, according to a positional relationship between magnetic sensors 11 and S magnetic poles 21S). Focusing on each detection system, detection patterns, with four digits, that are different from each other are output from first detection system 12A for respective positions of shift lever 101, and also detection patterns, with four digits, that are different from each other are output from second detection system 12B for respective positions of shift lever 101. Furthermore, the detection patterns in each detection system are set such that outputs of certain two digits among the four digits are identical to each other, and are different from outputs of two other digits.

Figure 4:
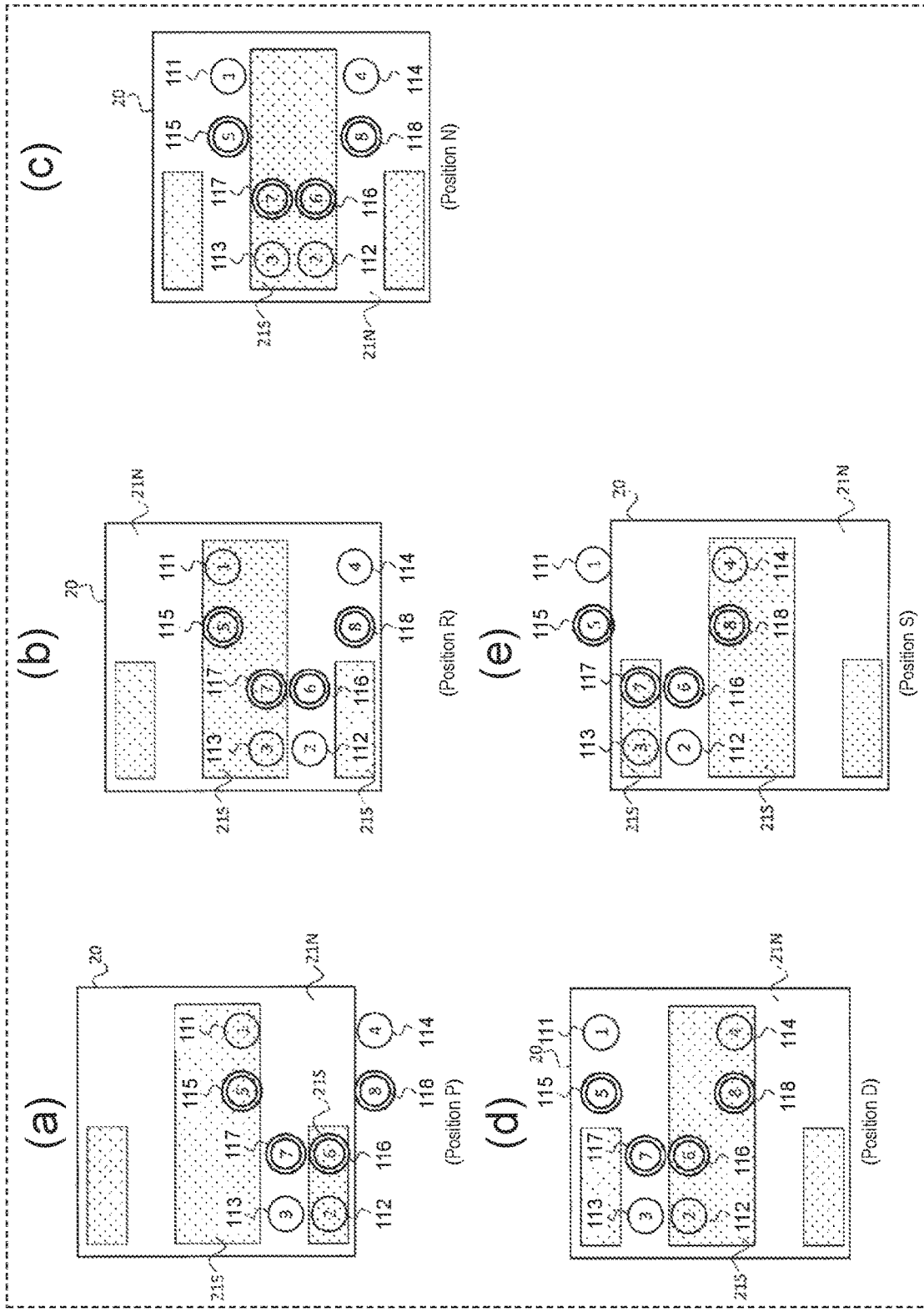
FIG. 4 is a schematic diagram of states of the position detection device when an operating unit is located at respective positions.

With reference to FIG. 4, detection patterns when shift lever 101 is located at respective positions will be described. In the case of position P illustrated in part (a) of FIG. 4, first and fifth magnetic sensors 111, 115 and second and sixth magnetic sensors 112, 116 face S magnetic poles 21S. In contrast, other magnetic sensors 11 face N magnetic pole 21N (do not face S magnetic poles 21S). Accordingly, in the detection pattern in this case, first, second, fifth, and sixth magnetic sensors 111, 112, 115, 116 each output the ON signal, and other sensors each output the OFF signal, as illustrated in a first row of the table in part (b) of FIG. 3.

Note that, in the table illustrated in part (b) of FIG. 3, notations of P, R, N, D, and S that are vertically aligned each indicate the positions where shift lever 101 is located. Notations of 1 to 8 that are horizontally aligned each indicate first to eighth magnetic sensors "111 to 118". Each box in the table denotes a content of the signal (ON or OFF) output from corresponding magnetic sensor 11 at a corresponding position. Note that, for convenience of visibility, only "ON" is denoted, whereas "OFF" is not denoted in the table.

Next, in the case of position R illustrated in part (b) of FIG. 4, first and fifth magnetic sensors 111, 115 and third and seventh magnetic sensors 113, 117 face S magnetic poles 21S. In contrast, other magnetic sensors 11 face N magnetic pole 21N (do not face S magnetic poles 21S). Accordingly, in the detection pattern in this case, first, third, fifth, and seventh magnetic sensors 111, 113, 115, 117 each output the ON signal, and other sensors each output the OFF signal, as illustrated in a second row of the table in part (b) of FIG. 3.

In the case of position N illustrated in part (c) of FIG. 4, third and seventh magnetic sensors 113, 117 and second and sixth magnetic sensors 112, 116 face S magnetic poles 21S. In contrast, other magnetic sensors 11 face N magnetic pole 21N (do not face S magnetic poles 21S). Accordingly, the detection pattern in this case, second, third, sixth, and seventh magnetic sensors 112, 113, 116, 117 each output the ON signal, and other sensors each output the OFF signal, as illustrated in a third row of the table in part (b) of FIG. 3.

In the case of position D illustrated in part (d) of FIG. 4, second and sixth magnetic sensors 112, 116 and fourth and eighth magnetic sensors 114, 118 face S magnetic poles 21S. In contrast, other magnetic sensors 11 face N magnetic pole 21N (do not face S magnetic poles 21S). Accordingly, in the detection pattern in this case, second, fourth, sixth, and eighth magnetic sensors 112, 114, 116, 118 each output the ON signal, and other sensors each output the OFF signal, as illustrated in a fourth row of the table in part (b) of FIG. 3.

Finally in the case of position S illustrated in part (e) of FIG. 4, third and seventh magnetic sensors 113, 117 and fourth and eighth magnetic sensors 114, 118 face S magnetic poles 21S. In contrast, other magnetic sensors 11 face N magnetic pole 21N (do not face S magnetic poles 21S). Accordingly, in the detection pattern in this case, third, fourth, seventh, and eighth magnetic sensors 113, 114, 117, 118 each output the ON signal, and other sensors each output the OFF signal, as illustrated in a fifth row of the table in part (b) of FIG. 3.

As described above, in position detection device 1A, each detection system 12 outputs different detection pattern for each position. Accordingly, even if any one of power supply systems 30 causes failure, and detection system 12 corresponding to this power supply system 30 stops outputting the signal, the detection signal from another detection system 12 enables position detection of shift lever 101. In other words, fail-safe against failure of the power supply system can be secured.

Position detection device 1A thus configured can secure a humming distance of "4" or more, as a whole. Accordingly, an error with three digits can be detected, and an error with one digit can be corrected.

FIG. 5 is a table illustrating the humming distances between respective positions. Herein, the "humming distance" is a well-known term in a communication field. Focusing on two codewords, a=(a1, a2, . . . an) and b=(b1, b2, . . . bn), the "humming distance" can be defined as a number of bits (digits) whose values (for example, 0 and 1, or ON and OFF) are different from each other in mutually corresponding bits (digits) between the codewords a and b. When the humming distance between any two codewords is larger than or equal to t+1, errors up to t pieces in the codeword can be detected. Further, when the humming distance between any two codewords is larger than or equal to 2t+1, errors up to t pieces in the codeword can be corrected.

As illustrated in FIG. 5, for position detection device 1A according to the first exemplary embodiment, the humming distance between position P and position S and the humming distance between position D and position R are both 8. Further, the humming distances between other positions are all 4. In other words, the humming distance of "4" or more is secured as a whole. Accordingly, for the error detection, t=3 is satisfied, and therefore errors in the output can be detected up to three pieces. For the error correction, t=1 is satisfied, and therefore one error in the output can be corrected. In this way, position detection device 1A secures the fail-safe even against failure of magnetic sensor 11.

When shift lever 101 is located at a certain position, detection patterns from respective detection systems 12 in position detection device 1A are designed to be identical. As illustrated in part (a) of FIG. 3, this configuration allows first to fourth magnetic sensors "111 to 114" in first detection system 12A and fifth to eighth magnetic sensors "115 to 118" in second detection system 12B to have an identical disposition. As a result, a space for disposing magnetic sensors 11 and permanent magnets 21 can be reduced.

(Modifications)

FIG. 6 schematically illustrates configurations of position detection devices 1 according to modifications of the first exemplary embodiment, and detection patterns. Note that, in any of position detection devices 1A1 to 1A4, a disposition of magnetic sensors 11 and permanent magnets 21 when shift lever 101 is located at position N is illustrated.

Similar to the configuration in part (a) of FIG. 3, in position detection device 1A1 in part (a) of FIG. 6, eight magnetic sensors 11 are disposed to form four lines. Specifically, in position detection device 1A1 in part (a) of FIG. 6, second magnetic sensor 112 and third magnetic sensor 113 in the configuration in part (a) of FIG. 3 are positionally reversed in the front-back direction, and sixth magnetic sensor 116 and seventh magnetic sensor 117 in the configuration part (a) of FIG. 3 are positionally reversed in the front-back direction. Other magnetic sensors 11 (first, fourth, fifth, and eighth magnetic sensors 111, 114, 115, 118) are disposed in the same manner as in part (a) of FIG. 3. Configurations of S magnetic poles 21S and N magnetic pole 21N are the same as in part (a) of FIG. 3.

In this case, in a detection pattern when shift lever 101 is at position P, first, third, fifth, and seventh magnetic sensors 111, 113, 115, 117 are ON, and other sensors are OFF. In a detection pattern when shift lever 101 is at position R, first, second, fifth, and sixth magnetic sensors 111, 112, 115, 116 are ON, and other sensors are OFF. In a detection pattern when shift lever 101 is at position N, second, third, sixth, and seventh magnetic sensors 112, 113, 116, 117 are ON, and other sensors are OFF. In a detection pattern when shift lever 101 is at position D, third, fourth, seventh, and eighth magnetic sensors 113, 114, 117, 118 are ON, and other sensors are OFF. In a detection pattern when shift lever 101 is at position S, second, fourth, sixth, and eighth magnetic sensors 112, 114, 116, 118 are ON, and other sensors are OFF.

In position detection device 1A2 in part (b) of FIG. 6, eight magnetic sensors 11 are disposed to form two lines. Specifically, two pairs of magnetic sensors 11 (first and fifth magnetic sensors 111, 115 and third and seventh magnetic sensors 113, 117) are disposed in a first line on a front side. First, fifth, seventh, and third magnetic sensors 111, 115, 117, 113 are disposed in this order from the right to the left. With a small space from those sensors, two pairs of magnetic sensors 11 (fourth and eighth magnetic sensors 114, 118 and second and sixth magnetic sensors 112, 116) are disposed in a second line on a rear side. Fourth, eighth, sixth, and second magnetic sensors 114, 118, 116, 112 are disposed in this order from the right to the left.

Furthermore, first magnetic sensor 111 and fourth magnetic sensor 114, fifth magnetic sensor 115 and eighth magnetic sensor 118, seventh magnetic sensor 117 and sixth magnetic sensor 116, and third magnetic sensor 113 and second magnetic sensor 112 are each disposed to positionally overlap with each other in a right-left direction.

S magnetic poles 21S are disposed at four points. First pole is provided as a rectangular region (region A20) including four magnetic sensors 11 (first, fourth, fifth, and eighth magnetic sensors 111, 114, 115, 118) on the right side. Second pole is provided as an oblong band-shaped region with a horizontally shorter length (region A21) in a region between the first line and the second line on the left side, that is, between third and seventh magnetic sensors 113, 117 and second and sixth magnetic sensors 112, 116.

Third pole is provided as an oblong band-shaped region with a horizontally shorter length (region A22) in further front of third and seventh magnetic sensors 113, 117 with a space equal to a single line from those magnetic sensors 11. Fourth pole is provided as an oblong band-shaped region with a horizontally shorter length (region A23) in further rear of second and sixth magnetic sensors 112, 116 with a space equal to a single line from those magnetic sensors 11. Note that S magnetic poles 21S in region A20 and region A21 may be connected to each other without providing a gap, to be integrated. N magnetic pole 21N is provided in a region excluding S magnetic poles 21S (region A24).

In this case, in a detection pattern when shift lever 101 is at position P, first, second, fifth, and sixth magnetic sensors 111, 112, 115, 116 are ON, and other sensors are OFF. In a detection pattern when shift lever 101 is at position R, first, third, fifth, and seventh magnetic sensors 111, 113, 115, 117 are ON, and other sensors are OFF. In a detection pattern when shift lever 101 is at position N, first, fourth, fifth, and eighth magnetic sensors 111, 114, 115, 118 are ON, and other sensors are OFF. In a detection pattern when shift lever 101 is at position D, second, fourth, sixth, and eighth magnetic sensors 112, 114, 116, 118 are ON, and other sensors are OFF. In a detection pattern when shift lever 101 is at position S, third, fourth, seventh, and eighth magnetic sensors 113, 114, 117, 118 are ON, and other sensors are OFF.

In position detection device 1A3 in part (c) of FIG. 6, eight magnetic sensors 11 are disposed to form four lines. Specifically a pair of magnetic sensors 11 (second and sixth magnetic sensors 112, 116) are disposed on a right side of a first line. For those magnetic sensors, second magnetic sensor 112 is disposed on a right side, and sixth magnetic sensor 116 is disposed on a left side. A pair of magnetic sensors 11 (first and fifth magnetic sensors 111, 115) are disposed on a left side of a second line. For those magnetic sensors, first magnetic sensor 111 is disposed on a left side, and fifth magnetic sensor 115 is disposed on a right side. A pair of magnetic sensors 11 (fourth and eighth magnetic sensors 114, 118) are disposed on a left side of a third line. For those magnetic sensors, fourth magnetic sensor 114 is disposed on a left side, and eighth magnetic sensor 118 is disposed on a right side. A pair of magnetic sensors 11 (third and seventh magnetic sensors 113, 117) are disposed on a right side of a fourth line. For those magnetic sensors, third magnetic sensor 113 is disposed on a right side, and seventh magnetic sensor 117 is disposed on a left side.

Furthermore, second magnetic sensor 112 and third magnetic sensor 113, sixth magnetic sensor 116 and seventh magnetic sensor 117, fifth magnetic sensor 115 and eighth magnetic sensor 118, and first magnetic sensor 111 and fourth magnetic sensor 114 are each disposed to positionally overlap with each other in a right-left direction.

S magnetic poles 21S are disposed at three points. First pole is provided as an oblong band-shaped region with a horizontally longer length (region A30) such that all magnetic sensors 11 in the second line and the third line positionally overlap with each other in a right-left direction. Second pole is provided as an oblong band-shaped region with a horizontally shorter length (region A31) in further front of first and fifth magnetic sensors 111, 115 with a space equal to a single line from those magnetic sensors 11. Third pole is provided as an oblong band-shaped region with a horizontally shorter length (region A32) in further rear of fourth and eighth magnetic sensors 114, 118 with a space equal to a single line from those magnetic sensors 11. N magnetic pole 21N is disposed in a region excluding S magnetic poles 21S (region A33).

In a detection pattern when shift lever 101 is at position P, second, fourth, sixth, and eighth magnetic sensors 112, 114, 116, 118 are ON, and other sensors are OFF. In a detection pattern when shift lever 101 is at position R, first, second, fifth, and sixth magnetic sensors 111, 112, 115, 116 are ON, and other sensors are OFF. In a detection pattern when shift lever 101 is at position N, first, fourth, fifth, and eighth magnetic sensors 111, 114, 115, 118 are ON, and other sensors are OFF. In a detection pattern when shift lever 101 is at position D, third, fourth, seventh, and eighth magnetic sensors 113, 114, 117, 118 are ON, and other sensors are OFF. In a detection pattern when shift lever 101 is at position S, first, third, fifth, and seventh magnetic sensors 111, 113, 115, 117 are ON, and other sensors are OFF.

In position detection device 1A4 in part (d) of FIG. 6, eight magnetic sensors 11 are disposed to form two lines. Specifically, two pairs of magnetic sensors 11 (first and fifth magnetic sensors 111, 115 and second and sixth magnetic sensors 112, 116) are disposed in a first line on a front side. For those magnetic sensors, first, fifth, sixth, and second magnetic sensors 111, 115, 116, 112 are disposed in this order from the right to the left. With a small space from those sensors, two pairs of magnetic sensors 11 (third and seventh magnetic sensors 113, 117 and fourth and eighth magnetic sensors 114, 118) are also disposed in a second line on a rear side. For those magnetic sensors, seventh, third, fourth, and eighth magnetic sensors 117, 113, 114, 118 are disposed in this order from right to left.

Furthermore, first magnetic sensor 111 and seventh magnetic sensor 117, fifth magnetic sensor 115 and third magnetic sensor 113, sixth magnetic sensor 116 and fourth magnetic sensor 114, and second magnetic sensor 112 and eighth magnetic sensor 118 are each disposed to positionally overlap with each other in a right-left direction.

S magnetic poles 21S are disposed at four points. A first pole is provided as a rectangular region (region A40) including four magnetic sensors 11 (first, third, fifth, and seventh magnetic sensors 111, 113, 115, 117) on the right side. A second pole is provided as an oblong band-shaped region with a horizontally shorter length (region A41) in a region between the first line and the second line on the left side, that is, between second and sixth magnetic sensors 112, 116, and fourth and eighth magnetic sensors 114, 118.

A third pole is provided as an oblong band-shaped region with a horizontally shorter length (region A42) in further front of second and sixth magnetic sensors 112, 116 with a space equal to a single line from those magnetic sensors 11. A fourth pole is provided as an oblong band-shaped region with a horizontally shorter length (region A43) in further rear of fourth and eighth magnetic sensors 114, 118 with a space equal to a single line from those magnetic sensors 11. Note that S magnetic poles 21S in region A40 and region A41 may be connected to each other without providing a gap, to be integrated. N magnetic pole 21N is provided in a region excluding S magnetic poles 21S (region A44).

In this case, in a detection pattern when shift lever 101 is at position P, first, fourth, fifth, and eighth magnetic sensors 111, 114, 115, 118 are ON, and other sensors are OFF. In a detection pattern when shift lever 101 is at position R, first, second, fifth, and sixth magnetic sensors 111, 112, 115, 116 are ON, and other sensors are OFF. In a detection pattern when shift lever 101 is at position N, first, third, fifth, and seventh magnetic sensors 111, 113, 115, 117 are ON, and other sensors are OFF. In a detection pattern when shift lever 101 is at position D, third, fourth, seventh, and eighth magnetic sensors 113, 114, 117, 118 are ON, and other sensors are OFF. In a detection pattern when shift lever 101 is at, position S, second, third, sixth, and seventh magnetic sensors 112, 113, 116, 117 are ON, and other sensors are OFF.

With any of position detection devices 1A1 to 1A1 illustrated in the above modifications, the humming distance of "4" or more can also be secured. Accordingly, errors in the output up to three pieces can be detected, and one error in the output can be corrected. Even when any one of power supply systems 30 causes failure, the position of shift lever 101 can be detected with detection system 12 that operates by being fed from another power supply system 30. In this way, position detection device 1 secures the fail-safe even against any failure of magnetic sensor 11 and power supply systems 30.

Note that the first exemplary embodiment illustrates an aspect in which magnetic sensors 11 included in two detection systems 12A. 12B are disposed to form pairs, but is not limited to this configuration. In other words, magnetic sensors 11 included in detection systems 12A, 12B may be disposed so as not to form pairs.

Figure 7:
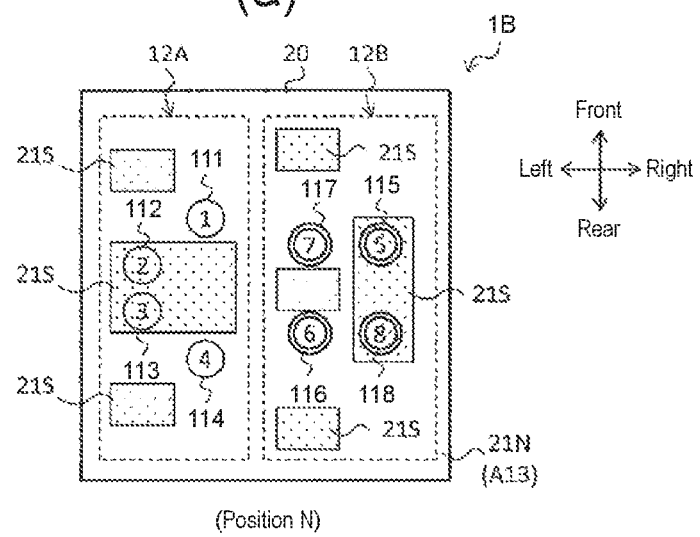
FIG. 7 schematically illustrates a configuration with magnetic sensors of two detection systems are respectively provided with disposition patterns different from each other (part (a)), and its detection patterns (part (b)).

Part (a) of FIG. 7 is a schematic diagram illustrating a configuration in which mutually-different disposition patterns are used for two groups of magnetic sensors 11 respectively included in two detection systems 12. Part (b) of FIG. 7 is a schematic table illustrating its detection patterns. As illustrated in part (a) of FIG. 7, in this position detection device 1B, magnetic sensors 11 (first to fourth magnetic sensors "111 to 114") in first detection system 12A and magnetic sensors 11 (fifth to eighth magnetic sensors "115 to 118") in second detection system 12B are not mixed with each other. First detection system 12A is disposed on a left side as a group, and second detection system 12B is disposed on a right side as a group.

The disposition pattern illustrated in part (a) of FIG. 6 is used for first to fourth magnetic sensors "111 to 114" in first detection system 12A, and required permanent magnets 21 for first to fourth magnetic sensors "111 to 114" are disposed in first detection system 12A. The disposition pattern illustrated in part (b) of FIG. 6 is used for fifth to eighth magnetic sensors "115 to 118" in second detection system 12B on the other side, and required permanent magnets 21 for fifth to eighth magnetic sensors "115 to 118" are also disposed in second detection system 12B. As illustrated in part (b) of FIG. 7, detection patterns at respective positions when shift lever 101 is operated in this position detection device 1B are configured by combining the patterns in part (a) of FIG. 6 and the patterns in part (b) of FIG. 6.

As described above, similar to other position detection devices 1 that have been already described, the fail-safe is secured against any failure of magnetic sensors 11 and power supply systems 30. Needless to say, use of a combination other than the patterns illustrated in FIG. 7 also achieves the same feature.

Second Exemplary Embodiment

In the first exemplary embodiment, with respect to the detection patterns in each detection system 12, a configuration that is set such that outputs of certain two digits among four digits are identical to each other, and are different from outputs of two other digits has been described. In a second exemplary embodiment, with respect to the detection patterns in each detection system 12, a configuration that is set such that outputs of certain three digits of four digits are identical to each other, and are different from an output of the other digit will be described.

Figure 8:
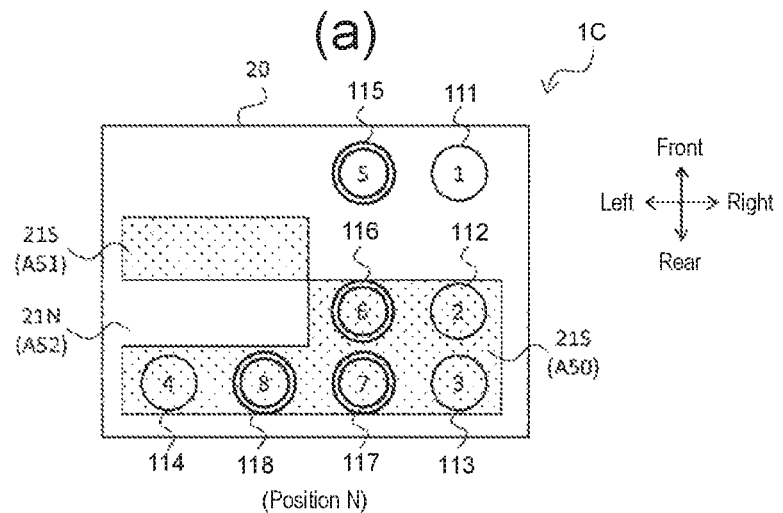
FIG. 8 schematically illustrates a configuration of a position detection device according to a second exemplary embodiment (part (a)), its detection patterns (part (b)), and humming distances (part (c)).

Part (a) of FIG. 8 is a schematic diagram illustrating a configuration of position detection device 1C according to the second exemplary embodiment. Part (b) of FIG. 8 is a schematic table illustrating detection patterns of position detection device 1C. Part (c) of FIG. 8 is a table illustrating humming distances. Note that part (a) of FIG. 8 illustrates a configuration when shift lever 101 is located at position N. Also in position detection device 1C according to the second exemplary embodiment, two detection systems are included. First to fourth magnetic sensors "111 to 114" belong to first detection system 12A, and fifth to eighth magnetic sensors "115 to 118" belong to second detection system 12B.

As illustrated in part (a) of FIG. 8, magnetic sensors 11 are disposed to form three lines from the front to the rear. Specifically, a pair of magnetic sensors 11 (first and fifth magnetic sensors 111, 115) are disposed in a first line located foremost. For those magnetic sensors, first magnetic sensor 111 is disposed on a right side, and fifth magnetic sensor 115 is disposed on a left side. A pair of magnetic sensors 11 (second and sixth magnetic sensors 112, 116) are disposed in a second line located behind the first line with a space equal to a single line. For those magnetic sensors, second magnetic sensor 112 is disposed on a right side, and sixth magnetic sensor 116 is disposed on a left side. Furthermore, two pairs of magnetic sensors 11 (third and seventh magnetic sensors 113, 117 and fourth and eighth magnetic sensors 114, 118) are disposed in a third line behind the second line. For those magnetic sensors, third, seventh, eighth, and fourth magnetic sensors 113, 117, 118, 114 are disposed in this order from the right to the left.

First magnetic sensor 111, second magnetic sensor 112, and third magnetic sensor 113 are disposed to positionally overlap with each other in a right-left direction. Fifth magnetic sensor 115, sixth magnetic sensor 116, and seventh magnetic sensor 117 are disposed to positionally overlap with each other the right-left direction.

S magnetic poles 21S are disposed at two points. A first pole is provided as a region formed by joining an oblong band-shaped region with a horizontally shorter length, which includes second and sixth magnetic sensors 112, 116 in the second line, and an oblong band-shaped region with a horizontally longer length, which includes third and seventh magnetic sensors 113, 117 and fourth and eighth magnetic sensors 114, 118 in the third line (region A50). A second pole is set as an oblong band-shaped region with a horizontally shorter length, which is located between the first line and the second line and ahead of fourth and eighth magnetic sensors 114, 118 (region A51). N magnetic pole 21N is provided in a region excluding S magnetic poles 21S (region A52).

In this case, detection patterns when shift lever 101 is located at respective positions are illustrated in part (b) of FIG. 8. Note that, in a detection pattern when shift lever 101 is at position P, first and fifth magnetic sensors 111, 115 are ON, and other sensors are OFF, in a detection pattern when shift lever 101 is at position R, second and sixth magnetic sensors 112, 116 are ON, and other sensors are OFF. In a detection pattern when shift lever 101 is at position N, second to fourth magnetic sensors "112 to 114" and sixth to eighth magnetic sensors "116 to 118" are ON, and other sensors are OFF. In a detection pattern when shift lever 101 is at position D, third and seventh magnetic sensors 113, 117 are ON, and other sensors are OFF. In a detection pattern when shift lever 101 is at position S, fourth and eighth magnetic sensors 114, 118 are ON, and other sensors are OFF.

Position detection device 1C thus configured also secures the humming distance of 4 or more, as illustrated in part (c) of FIG. 8. Accordingly, errors in the output up to three pieces can be detected, and one error in the output can be corrected. Even when any one of power supply systems 30 causes failure, the position of shift lever 101 can be detected with detection system 12 that operates by being fed from another power supply system 30. In this way, position detection device 1C secures the fail-safe even against any failure of magnetic sensor 11 and power supply systems 30.

Third Exemplary Embodiment

In the first and second exemplary embodiments, a case where respective positions are linearly disposed in the front-back direction is described, but a two-dimensional disposition can be adopted as a disposition of respective positions.

Figure 9:
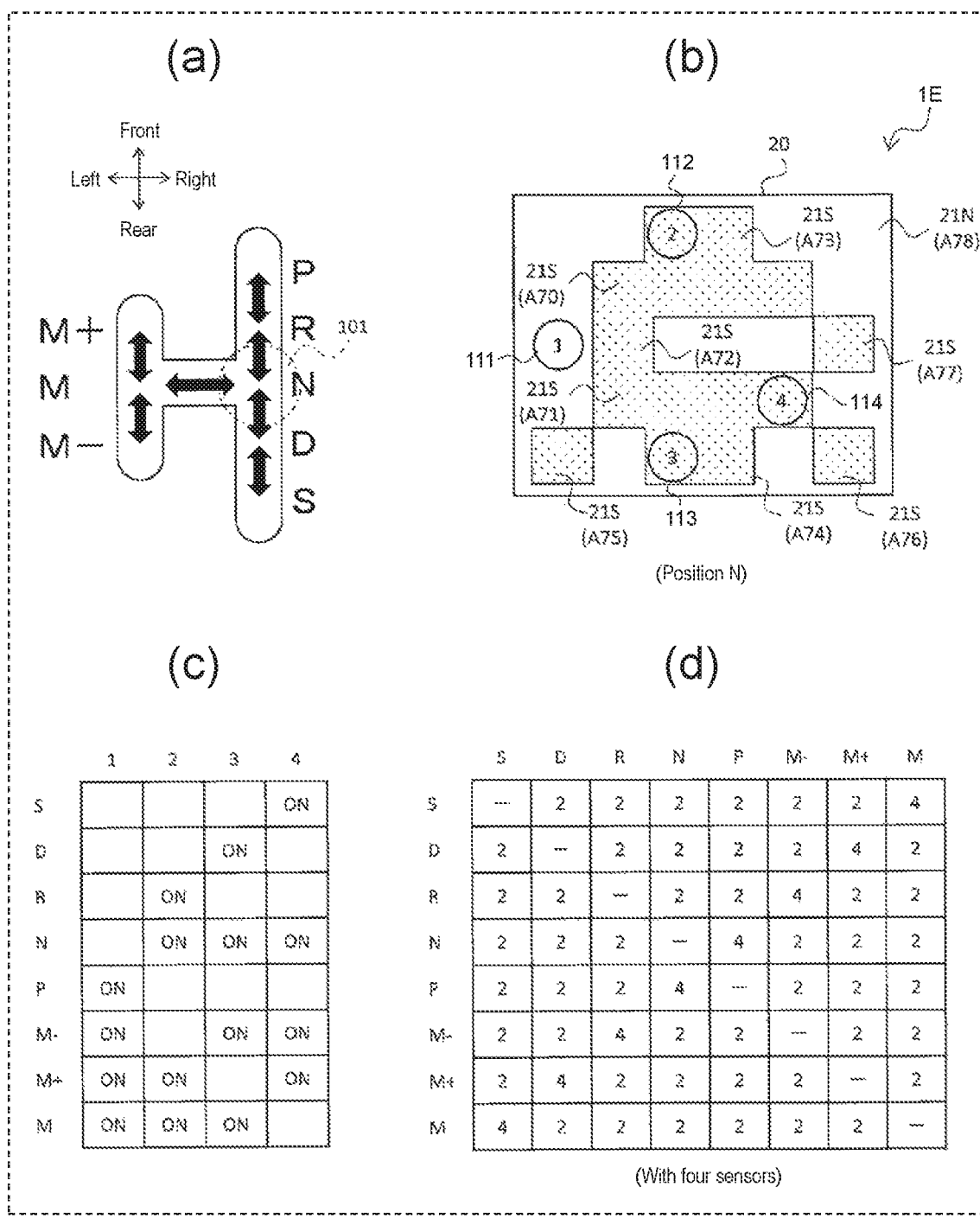
FIG. 9 schematically illustrates a disposition of respective positions in a position detection device according to a third exemplary embodiment (part (a)), a configuration of the position detection device (part (b)), its detection patterns (part (c)), and humming distances (part (d)).

With a position detection device in which respective positions are two-dimensionally disposed, when the position detection device is configured such that outputs of certain three digits among four digits are identical to each other, and are different from an output of the other single digit, eight positions or less can be detected. Part (a) of FIG. 9 is a schematic diagram illustrating a disposition of respective positions in position detection device 1E according to the third exemplary embodiment. Part (b) of FIG. 9 is a schematic diagram illustrating a configuration of position detection device 1E. Part (c) of FIG. 9 is a schematic table illustrating its detection patterns. Part (d) of FIG. 9 is a table illustrating humming distances. Note that, part (b) in FIG. 9 illustrates only a configuration of one detection system (first to fourth magnetic sensors "111 to 114").

As illustrated in part (a) of FIG. 9, position detection device 1E according to the third exemplary embodiment includes position M (manual position). Position M− (shift-down position) is located behind position M. Position M+ (shift-up position) is located ahead of position M. Position N is located on a right side of position M. Position R is located ahead of position N. Position P is located ahead of position R. Position D is located behind position N. Position S is located behind position D.

As illustrated with thick arrows in part of FIG. 9, shift lever 101 displaces back and forth between position M and position M−, displaces back and forth between position M and position M+, and displaces right and left between position M and position N. Further, shift lever 101 displaces back and forth between position N and position R, and displaces back and forth between position R and position P. Moreover, shift lever 101 displaces back and forth between position N and position D, and displaces back and forth between position D and position S.

With reference to part (b) of FIG. 9, the configuration of position detection device 1E will be described. Note that a configuration when shift lever 101 is located at position N is illustrated here. Magnetic sensors 11 are disposed at four points while being separated from each other in front, rear, right, and left directions. Specifically, first magnetic sensor 111 and fourth magnetic sensor 114 are located while being separated from each other in a right-left direction, and fourth magnetic sensor 114 on a right side is disposed slightly rearward from first magnetic sensor 111 on a left side. Second magnetic sensor 112 and third magnetic sensor 113 are located while being separated from each other in a front-back direction, and are disposed so as to positionally coincide with each other in the right-left direction. Those four magnetic sensors 11 are disposed such that an intermediate position between first magnetic sensor 111 and fourth magnetic sensor 114 substantially coincides with an intermediate position between second magnetic sensor 112 and third magnetic sensor 113.

On the other hand, as illustrated in part (b) FIG. 9, S magnetic poles 21S are provided in regions attached with signs A70 to A78. Among those regions, region A70 is an oblong band-shaped region that is interposed between first magnetic sensor 111 and second magnetic sensor 112 ahead of first magnetic sensor 111. A left end of region A70 is located between first magnetic sensor 111 and second magnetic sensor 112 in the right-left direction, and a right end of region A70 is located ahead of fourth magnetic sensor 114. Region A71 is an oblong band-shaped region that is interposed between first magnetic sensor 111 and third magnetic sensor 113 behind first magnetic sensor 111. A left end of region A71 is located between first magnetic sensor 111 and third magnetic sensor 113 in the right-left direction, and a right end of region A71 is located on fourth magnetic sensor 114.

Region A72 is provided on a right side of first magnetic sensor 111 to connect a left end of region A70 to a left end of region A71. Region A73 is a region protruding forward from region A70, and is set as a region including a range overlapping with second magnetic sensor 112 and a range on a right side of the overlapping range. In other words, region A73 is an oblong band-shaped region that has a dimension made substantially half of a dimension of region A70 in the right-left direction, and is disposed forwardly adjacent to region A70 such that a center of region A73 on the right-left direction coincides with a center of region A70 in the right-left direction. Region A74 is a region protruding rearward from region A71, and is set as a region including a range overlapping with third magnetic sensor 113 and a range on a right side of the overlapping range. In other words, region A74 is an oblong band-shaped region that has a dimension made substantially half of a dimension of region A71 in the right-left direction, and is disposed rearwardly adjacent to region A71 such that a center of region A74 in the right-left direction coincides with a center of region A71 in the right-left direction.

Region A75 is located on a left side of third magnetic sensor 113 and behind first magnetic sensor 111, and is a substantially square region set so as to be adjacent to a left rear corner of region A71. Region A76 is located on a right side of third magnetic sensor 113, and is a substantially square region set so as to be adjacent a right rear corner of region A71. Region A77 is a substantially square region set so as to be adjacent to both a right rear corner of region A70 and a right front corner of region A71.

Among the above-described regions, each of regions A70 to A74 is adjacent to any other region, and therefore S magnetic poles 21S provided in respective regions are connected to each other to be integrated. N magnetic pole 21N is provided in a region excluding S magnetic poles 21S (region A78).

With reference to part (c) of FIG. 9, detection patterns (that are detected by one detection system) in this position detection device 1E when shift lever 101 is located at respective positions will be described. In a detection pattern when shift lever 101 is at position S, fourth magnetic sensor 114 is ON, and other sensors are OFF. In a detection pattern when shift lever 101 is at position D, third magnetic sensor 113 is ON, and other sensors are OFF. In a detection pattern when shift lever 101 is at position R, second magnetic sensor 112 is ON, and other sensors are OFF. In a detection pattern when shift lever 101 is at position N, second, third, and fourth magnetic sensors 112, 113, 114 are ON, and first magnetic sensor 111 is OFF. In a detection pattern when shift lever 101 is at position P, first magnetic sensor 111 is ON, and other sensors are OFF.

In a detection pattern when shift lever 101 is at position M−, first, third, and fourth magnetic sensors 111, 113, 114 are ON, and second magnetic sensor 112 is OFF. In a detection pattern when shift lever 101 is at position M+, first, second, and fourth magnetic sensors 111, 112, 114 are ON, and third magnetic sensor 113 is OFF. In a detection pattern when shift lever 101 is at position M, first, second, and third magnetic sensors 111, 112, 113 are ON, and fourth magnetic sensor 114 is OFF.

As illustrated in part (d) of FIG. 9, such position detection device 111 also secures the humming distance of 2 or more in one detection system 12. In other words, two detection systems provided as described above can secure the humming distance of 4 or more. Accordingly, errors in the output up to three pieces can be detected, and one error in the output can be corrected. Even when any one of power supply systems 30 causes failure, the position of shift lever 101 can be detected with detection system 12 that operates by being fed from another power supply system 30. In this way, position detection device 1E secures the fail-safe even against any failure of magnetic 11 and power supply systems 30.

Fourth Exemplary Embodiment

Figure 10:
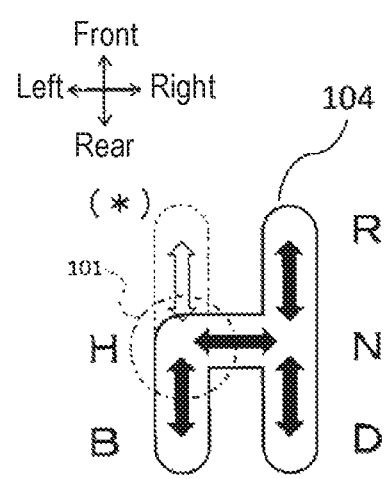
FIG. 10 is a schematic diagram of a disposition of respective positions of a position detection device according to a fourth exemplary embodiment.
Figure 11:
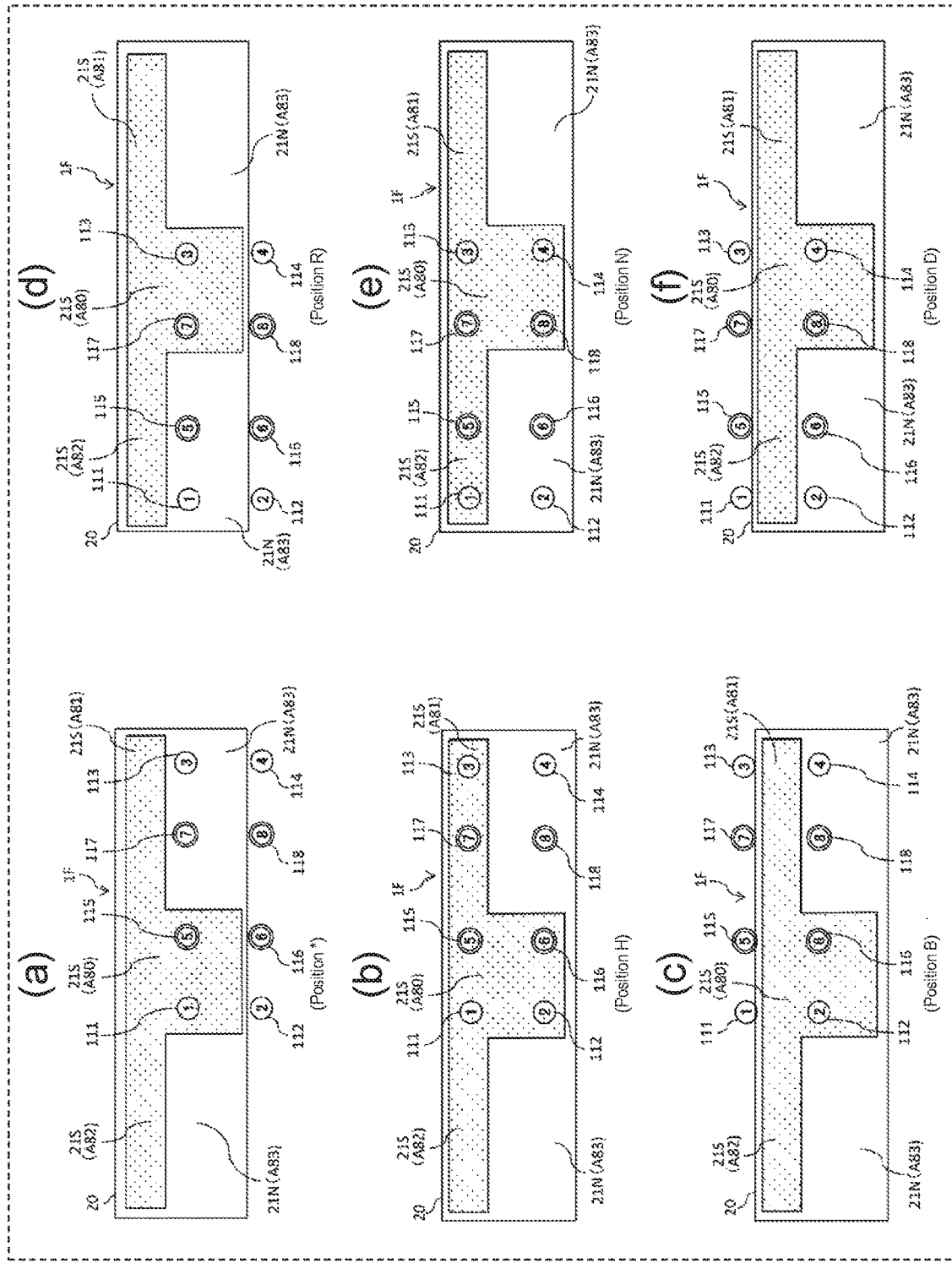
FIG. 11 is a schematic diagram of states of the position detection device when an operating unit is located at respective positions.

A fourth exemplary embodiment will be described as a modification of the third exemplary embodiment. FIG. 10 is a schematic diagram illustrating a disposition of respective positions in a position detection device according to the fourth exemplary embodiment. FIG. 11 illustrates configurations at respective positions in position detection device 1F. Part (a) of FIG. 12 schematically illustrates detection patterns. Part (b) of FIG. 12 illustrates humming distances.

Position detection device 1F according to the fourth exemplary embodiment is a position detection device in which respective positions are two-dimensionally disposed. In other words, shift lever 101 displaces at five positions including position H, position B, position N, position R, and position D. Note that, when guide groove 104 that regulates an operating direction of shift lever 101 is partly changed to enable displacement at position * that is displayed as (*), shift lever 101 can displace at six positions.

Similar to the third exemplary embodiment, position detection device 1F is set such that outputs of certain three digits of four digits at each position are identical to each other, and are different from an output of the other single digit.

With reference to part (b) of FIG. 11, a configuration of position detection device 1F with five positions will be described. Herein a configuration when shift lever 101 is located at position H is illustrated. Note that icons attached with FIGS. 1 to 4 in single circles respectively represent first to fourth magnetic sensors "111 to 114" in first detection system 12A, and icons attached FIGS. 5 to 8 in double circles respectively represent fifth to eighth magnetic sensors "115 to 118" in second detection system 12B.

Eight magnetic sensors 11 are disposed so as to form two lines. Specifically, two pairs of magnetic sensors 11 (first and fifth magnetic sensors 111, 115 and third and seventh magnetic sensors 113, 117) are disposed in a first line on a front side. For those magnetic sensors, the third, seventh, fifth, and first magnetic sensors are disposed in this order from the right to the left. With a small space from those sensors, two pairs of magnetic sensors 11 (second and sixth magnetic sensors 112, 116 and fourth and eighth magnetic sensors 114, 118) are disposed in a second line on a rear side. For those magnetic sensors, the fourth, eighth, sixth, and second magnetic sensors are disposed in this order from right to left.

Furthermore, first magnetic sensor 111 and second magnetic sensor 112, fifth magnetic sensor 115 and sixth magnetic sensor 116, seventh magnetic sensor 117 and eighth magnetic sensor 118, and third magnetic sensor 113 and fourth magnetic sensor 114 are each disposed to positionally overlap with each other in a right-left direction.

On the other hand, S magnetic pole 21S has a substantially T shape, and is formed with three regions. A first region is provided as a substantially-central rectangular region (region A80) including four magnetic sensors (first, second, fifth, and sixth magnetic sensors 111, 112, 115, 116). A second region is provided as an oblong band-shaped region (region A81) that includes two magnetic sensors (seventh and third magnetic sensors 117, 113). Region A81 extends rightward from a front side of region A80. A third region is provided as an oblong band-shaped region (region A82) with a length and a width substantially identical to those of region A81. Region A82 extends leftward from the front side of region A80. As illustrated in part (c) of FIG. 11, and part (t) of FIG. 11, widths of region A81 and region A82 in a front-back direction are slightly smaller than an interval between a first line and a second line of magnetic sensors 11. Note that, in this exemplary embodiment, region A80, region A81, and region A82 are integrally disposed to form the substantially T shape. However, the substantially T shape may be divided with predetermined gaps provided between region A80 and region A81, and between region A80 and region A82. N magnetic pole 21N is provided in a region excluding S magnetic pole 21S (region A83).

With reference to FIG. 11, detection patterns when shift lever 101 is located at respective positions will be described. In the case of position H illustrated in part (b) of FIG. 11, first and fifth magnetic sensors 111, 115, second and sixth magnetic sensors 112, 116, and third and seventh magnetic sensors 113, 117 face S magnetic poles 21S. In contrast, other magnetic sensors 11 face N magnetic pole 21N, or do not face S magnetic pole 21S. Accordingly, in the detection pattern in this case, first, second, third, fifth, sixth and seventh magnetic sensors 111, 112, 113, 115, 116, 117 each output the ON signal, and other sensors each output the OFF signal, as illustrated in a second row of a table in part (a) of FIG. 12.

In the case of position B illustrated in part (c) of FIG. 11, second and sixth magnetic sensors 112, 116 face S magnetic pole 21S. In contrast, other magnetic sensors 11 face N magnetic pole 21N, or do not face S magnetic pole 21S. Accordingly, in the detection pattern in this case, first, second and sixth magnetic sensors 112, 116 each output the ON signal, and other sensors each output the OFF signal, as illustrated in a third row of the table in part of FIG. 12.

In the case of position R illustrated in part (d) of FIG. 11, third and seventh magnetic sensors 113, 117 face S magnetic pole 21S. In contrast, other magnetic sensors 11 face N magnetic pole 21N, or do not face S magnetic pole 21S. Accordingly, in the detection pattern in this case, third and seventh magnetic sensors 113, 117 each output the ON signal, and other sensors each output the OFF signal, as illustrated in a fourth row of the table in part (a) of 12.

In the case of position N illustrated part (e) of FIG. 11, first and fifth magnetic sensors 111, 115, third and seventh magnetic sensors 113, 117, and fourth and eighth magnetic sensors 114, 118 face S magnetic poles 21S. In contrast, other magnetic sensors 11 face N magnetic pole 21N, or do not face S magnetic pole 21S. Accordingly, in the detection pattern in this case, first, third, fourth, fifth, seventh and eighth magnetic sensors 111, 113, 114, 115, 117, 118 each output the ON signal, and other sensors each output the OFF signal, as illustrated in a fifth row of the table in part (a) of FIG. 12.

In the case of position D illustrated in part (f) of FIG. 11, fourth and eighth magnetic sensors 114, 118 face S magnetic pole 21S. In contrast, other magnetic sensors 11 face N magnetic pole 21N, or do not face S magnetic pole 21S. Accordingly, in the detection pattern in this case, first, fourth and eighth magnetic sensors 114, 118 each output the ON signal, and other sensors each output the OFF signal, as illustrated as a sixth row of the table in part (a) of FIG. 12.

As illustrated in part (a) of FIG. 11, when a new position located ahead of position (refer to an outlined thick arrow in FIG. 10) is provided to be six positions that can displace at position *, first and fifth magnetic sensors 111, 115 face S magnetic pole 21S. In contrast, other magnetic sensors 11 face N magnetic pole 21N, or do not face S magnetic pole 21S. Accordingly, in the detection pattern in this case, first and fifth magnetic sensors 111, 115 each output the ON signal, and other sensors each output the OFF signal, as illustrated in a first row of the table in part (a) of FIG. 12.

Accordingly, as illustrated in detection patterns in part (a) of FIG. 12, in the position detection device in which respective positions are two-dimensionally disposed, among four digits of the detection pattern at each position, outputs of certain three digits are to be identical to each other, and to be different from an output of the other single digit. This can detect five positions or six positions.

Also in such position detection device 1F the humming distances of 4 or more can be secured between respective positions, as illustrated in part (b) of FIG. 12. Accordingly, errors in the output up to three pieces can be detected, and one error in the output can be corrected. Even when any one of power supply systems 30 causes failure, the position of shift lever 101 can be detected with detection system 12 that operates by being fed from another power supply system 30. In this way, position detection device 1F secures the fail-safe even against any failure of magnetic sensor 11 and power supply systems 30.

Moreover, forming S magnetic pole 21S into the substantially T shape facilitates manufacturing of permanent magnet 21, in comparison with a case where S magnetic poles 21S are sparsely disposed.

Also for position detection device 1 described in the third and fourth exemplary embodiments, magnetic sensors 11 belonging to two detection systems are disposed so as to form pairs, and detection patterns of respective detection systems are set to be identical when shift lever 101 is located at an identical position. This can reduce a total size. Note that, in the above description, a case where magnetic sensors 11 are used to configure the detector, but the configuration of the detector is not limited to magnetic sensors. The detector may be configured by using a contact sensor that detects presence of physical contact or an optical sensor that detects presence of light reception, or may further be configured by using sensors of other types. The position detection device according to the present invention is not limited to the aspects illustrated in first to fifth exemplary embodiments. The disposition pattern of the magnetic sensors and the magnets can adopt other layouts, for example.

Fifth Exemplary Embodiment

An external configuration of a shift device applied with a position detection device according to a fifth exemplary embodiment of the present invention is similar to that of the first exemplary embodiment illustrated in FIG. 1. A detailed description of the external configuration is thus omitted. In the following exemplary embodiment, the position detection device is the same as that in the first exemplary embodiment, unless otherwise indicated.

An electrical configuration of position detection device 1 according to the fifth exemplary embodiment is similar to the electrical configuration illustrated in FIG. 2 except for a number of magnetic sensors. Position detection device 1 includes two detection systems 12 (12A, 12B). Each detection system 12 includes three magnetic sensors 11. Specifically, first detection system 12A includes first to third magnetic sensors "111 to 113" as three magnetic sensors 11, and second detection system 12B includes fourth to sixth magnetic se "114 to 116" as three magnetic sensors 11.

Detection systems 12 are respectively fed from power supply systems 30 (30A, 30B) that are different from each other. In other words, first detection system 12A is connected to first power supply system 30A, and first to third magnetic sensors "111 to 113" are fed from first power supply system 30A. In addition, second detection system 12B is connected to second power supply system 30B, and fourth to sixth magnetic sensors "114 to 116" are fed from second power supply system 30B. Note that power supply systems 30A and 30B may be respectively configured with power supply circuits each including a battery, or may be respectively configured with power supply circuits that use a common battery.

Figure 13:
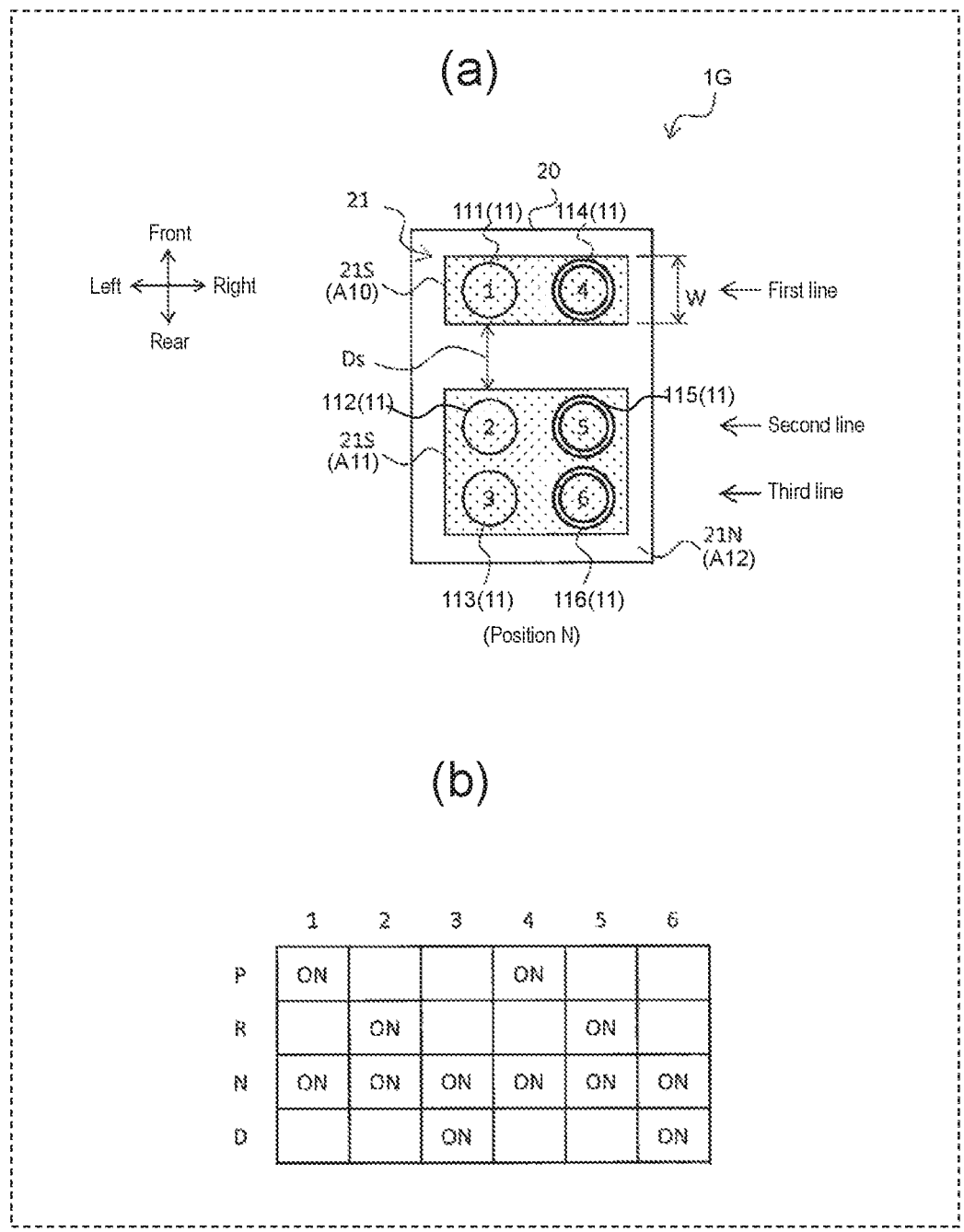
FIG. 13 illustrates a schematic configuration of the position detection device (part (a)), and a table illustrating detection patterns (part (b)).

Part (a) of FIG. 13 is a schematic diagram illustrating a configuration of position detection device 1G according to the fifth exemplary embodiment, and particularly illustrates dispositions of magnetic sensors 11 and permanent magnets 21, when shift lever 101 is located at position N. Note that icons attached with FIGS. 1 to 3 in single circles respectively represent first to third magnetic sensors "111 to 113" in first detection system 12A, and icons attached with FIGS. 4 to 6 in double circles respectively represent fourth to sixth magnetic sensors "114 to 116" in second detection system 12B.

As illustrated, with respect to magnetic sensors 11, one magnetic sensor in first detection system 12A is disposed on a left side, and one magnetic sensor second detection system 12B is disposed on a right side, to form a pair. Such three pairs in total are aligned along a front-back direction. Specifically, first and fourth magnetic sensors 111, 114 are disposed as a pair in a first line located foremost. Second and fifth magnetic sensors 112, 115 are disposed as a pair in second line behind the first line with predetermined distance Ds from the first line. Third and sixth magnetic sensors 113, 116 are disposed as a pair in a third line behind the second line. Note that distance Ds between the first line and the second line is designed to be a substantially identical dimension to a dimension, in the front-back direction, required to place magnetic sensors 11 (for example, a dimension, in the front-back direction, occupied by the first line: hereinafter referred to as "line dimension W").

Note that each magnetic sensor is configured with, for example, a Hall IC, and has a detection function with one bit that outputs one of two values according to a positional relationship with permanent magnets 21 (detection target unit). Specifically, each magnetic sensor 11 configured to detect the S pole outputs an ON signal when facing the S pole, and outputs an OFF signal when not facing the S pole. Note that each magnetic sensor 11 may be configured to detect the N pole.

On the other hand, permanent magnets 21 are formed in a pattern with a predetermined shape on a lower surface of supporter 20. Specifically, when shift lever 101 is located at position N, S magnetic pole 21S is provided at a position (region A10) overlapping with magnetic sensors 11 in the first line described above, so as to have a horizontally-long band shape having a dimension, in the front-back direction, substantially identical to line dimension W, as illustrated in part (a) of FIG. 13. Furthermore, S magnetic pole 21S is provided at a position (region A11) overlapping with magnetic sensors 11 in the second and third lines, so as to have a rectangle shape having a dimension in the front-back direction, substantially twice line dimension W. S magnetic pole 21S is not provided between region A10 and region A11, that is, in a region that faces distance Ds when shift lever 101 is located at position N.

Note that non-magnetic body having no magnetism may configure region A12 excluding two regions, regions A10, A11, provided with S magnetic poles 21S. It should be noted that, in the fifth exemplary embodiment, N magnetic pole 21N is provided at region A12 to facilitate detection of S magnetic poles 21S by magnetic sensors 11. In order to clarify a border between regions of S magnetic poles 21S and other regions.

With position detection device 1G thus configured, when shift lever 101 is operated, detection patterns, with six digits, that are different from each other are output for respective positions (that is, according to a positional relationship between magnetic sensors 11 and S magnetic poles 21S). Focusing on each detection system, detection patterns, with three digits, that are different from each other are output from first detection system 12A for respective positions of shift lever 101, and also detection patterns, with three digits, that are different from each other are output from second detection system 12B for respective positions of shift lever 101. Furthermore, the detection patterns in respective detection systems are set such that an output of a certain digit among the three digits is identical to an output of a corresponding digit, and is different from outputs of two other digits.

Figure 14:
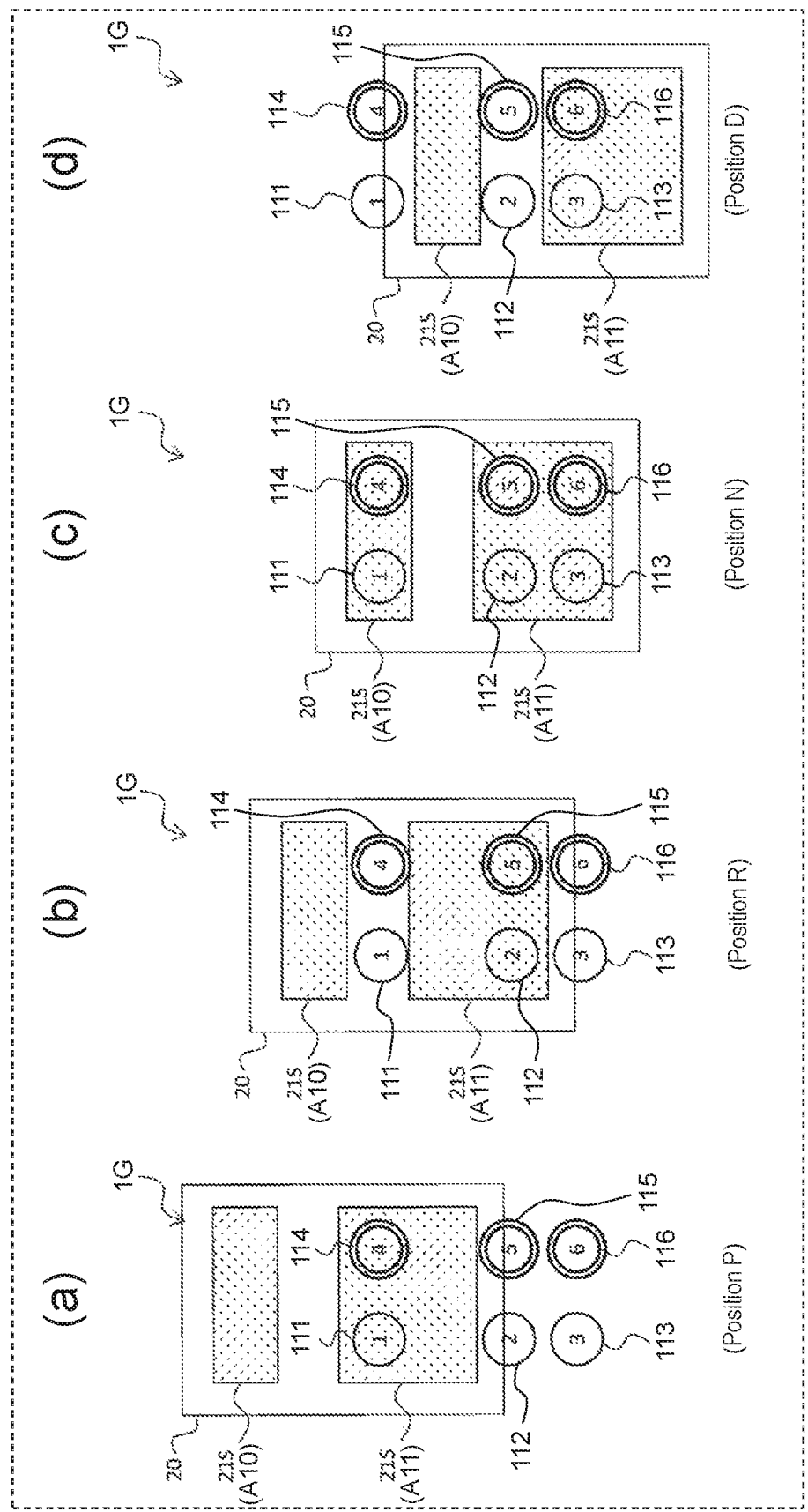
FIG. 14 is a schematic diagram of states of the position detection device when an operating unit is located at respective positions.

With reference to FIG. 14, detection patterns when shift lever 101 is located at respective positions will be described. In the case of position P illustrated in part (a) of FIG. 14, first and fourth magnetic sensors 11 face S magnetic pole 21B in region A11. In contrast, other magnetic sensors 11 face N magnetic pole 21N (or, do not face S magnetic poles 21S). Accordingly, in the detection pattern in this case, first and fourth magnetic sensors 11 each output the ON signal, and other sensors each output the OFF signal, as illustrated in a first row of a table in part (b) of FIG. 13.

Note that, in the table illustrated in part (b) of FIG. 13, notations of P, R, N, D, and S that are vertically aligned each indicate the positions where shift lever 101 is located. Notations of 1 to 6 that are horizontally aligned respectively indicate first to sixth magnetic sensors "111 to 116". Each box in the table denotes a content of the signal (ON or OFF) output from corresponding magnetic sensor 11 at a corresponding position. Note that, for convenience of visibility, only "ON" is denoted, whereas "OFF" is not denoted in the table.

In the case of position R illustrated in part (b) of FIG. 14, second and fifth magnetic sensors 112, 115 face S magnetic pole 21S in region A11. In contrast, other magnetic sensors 11 face N magnetic pole 21N (or, do not face S magnetic poles 21S). Accordingly, in a detection pattern in this case, second and fifth magnetic sensors 112, 115 each output the ON signal, and other sensors each output the OFF signal, as illustrated in a second row of the table in part (b) of FIG. 13.

In a case of position N in part (c) of FIG. 14, first and fourth magnetic sensors 111, 114 face S magnetic pole in region A10, and second, third, fifth, and sixth magnetic sensors 112, 113, 115, 116 face S magnetic pole 21S in region A11. Accordingly, in a detection pattern in this case, first to sixth magnetic sensors "111 to 116" all output the ON signal, as illustrated in a third row of the table in part (b) of FIG. 13.

In the case of position D illustrated in part (d) of FIG. 14, third and sixth magnetic sensors 11 face S magnetic pole 21S in region A11. In contrast, other magnetic sensors 11 face N magnetic pole 21N (or, do not face S magnetic poles 21S). Accordingly, in a detection pattern in this case, third and sixth magnetic sensors 113, 116 each output the ON signal, and other sensors each output the OFF signal, as illustrated in a fourth row of the table in part (b) of FIG. 13.

As described above, in each detection system 12 position detection device 1G outputs different detection pattern for each position. Accordingly, even if any one of power supply systems 30 causes failure, and detection system 12 corresponding to this power supply system 30 stops outputting the signal, the detection signal from another detection system 12 enables position detection of shift lever 101. In other words, fail-safe against failure of the power supply system can be secured.

Position detection device 1G thus configured can secure a humming distance of "4" or more as a whole. Accordingly, an error with three digits can be detected, and an error with one digit can be corrected.

Figure 15:
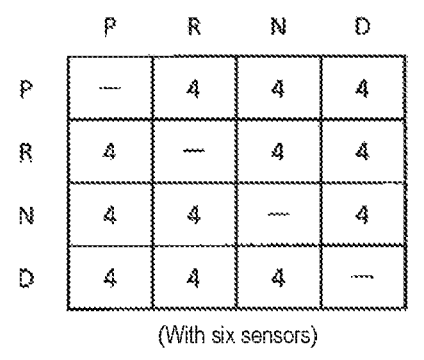

FIG. 15 is a table illustrating the humming distances between respective positions.

As illustrated in FIG. 15, in position detection device 1G according to the fifth exemplary embodiment, the humming distance between any positions amounts to 4. In other words, the humming distance of "4" or more is secured as a whole. Accordingly, for the error detection, t=3 is satisfied, and therefore errors in the output can be detected up to three pieces. For the error correction, t=1 is satisfied, and therefore one error in the output can be corrected. In this way, position detection device 1G secures the fail-safe even against failure of magnetic sensor 11.

When shift lever 101 is located at a certain position, detection patterns from respective detection systems 12 in position detection device 1G are designed to be identical. As illustrated in part (a) of FIG. 13, this configuration allows first to third magnetic sensors "111 to 113" in first detection system 12A and fourth to sixth magnetic sensors "114 to 116" in second detection system 12B to have an identical disposition. As a result, a space for disposing magnetic sensors 11 and permanent magnets 21 can be reduced.

Sixth Exemplary Embodiment

Figure 16:
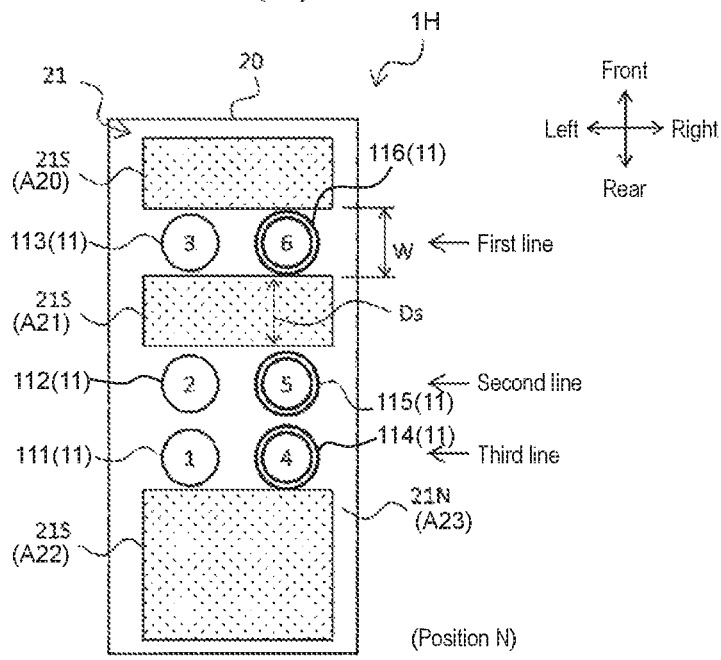
FIG. 16 schematically illustrates a configuration of a position detection device according to a sixth exemplary embodiment (part (a)), its detection patterns (part (b)), and humming distances (part (c)).

Other examples of the position detection device applicable to the shift device illustrated in FIG. 1. Part (a) of FIG. 16 is a schematic diagram illustrating a configuration of position detection device 1H according to a sixth exemplary embodiment. Part (b) of FIG. 16 is a table illustrating its detection patterns. Part (c) of FIG. 16 is a table illustrating humming distances. Note that part (a) of FIG. 16 illustrates a configuration when shift lever 101 is located at position N. An electrical configuration of position detection device 1H according to the sixth exemplary embodiment is identical to that illustrated in the block diagram in FIG. 2. In other words, position detection device 1H according to the present exemplary embodiment also includes two detection systems. First to third magnetic sensors "111 to 113" belong to first detection system 12A, and fourth to sixth magnetic sensors "114 to 116" belong to second detection system 12B.

As illustrated in part (a) of FIG. 16, with respect to magnetic sensors 11, one magnetic sensor in first detection system 12A and one magnetic sensor in second detection system 12B form a pair. Three pairs in total are aligned along a front-back direction. Specifically, third and sixth magnetic sensors 113, 116 are disposed as a pair in a first line located foremost. Second and fifth magnetic sensors 112, 115 are disposed as a pair in a second line behind the first line with predetermined distance Ds from the first line. First and fourth magnetic sensors 111, 114 are disposed as a pair in a third line behind the second line. Note that distance Ds between the first line and the second line is designed to be a substantially identical dimension to a dimension, in the front-back direction, required to place magnetic sensors 11 (that is, "line dimension W" defined in the fifth exemplary embodiment).

S magnetic poles 21S are disposed at three points on a lower surface of supporter 20. First one of S magnetic poles 21S is provided at a position (region A20) overlapping with a forward region of magnetic sensors 11 in the first line, so as to have a band shape having a dimension, the front-back direction, substantially identical to line dimension W. Second one of S magnetic poles 21S is provided at a position (region A21) overlapping with a region between the first line and the second line, so as to have a band shape having a dimension, in the front-back direction, substantially identical to line dimension W. Third one of S magnetic poles 21S is provided at a position (region A22) overlapping with a rearward region of magnetic sensors 11 in the third line, so as to have a band shape having a dimension, in the front-back direction, substantially twice line dimension W. In region A23 excluding regions A20, A21, A22, N magnetic pole 21N is provided, S magnetic pole 21S is not provided.

In this case, detection patterns when shift lever 101 is located at respective positions are illustrated in part (b) of FIG. 16. In a detection pattern when shift lever 101 is at position P, first, second, fourth, and fifth magnetic sensors 111, 112, 114, 115 are ON, and other sensors are OFF. In a detection pattern when shift lever 101 is at position R, first, third, fourth, and sixth magnetic sensors 111, 113, 114, 116 are ON, and other sensors are OFF. In a detection pattern when shift lever 101 is at position N, first to sixth magnetic sensors "111 to 116" all are OFF. In a detection pattern when shift lever 101 is at position D, second, third, fifth, and sixth magnetic sensors 112, 113, 115, 116 are ON, and other sensors are OFF.

Position detection device 1H thus configured also secures the humming distance of 4 or more, as illustrated in part (c) of FIG. 16. Accordingly, errors in the output up to three pieces can be detected, and one error in the output can be corrected. Even when any one of power supply systems 30 causes failure, the position of shift lever 101 can be detected with detection system 12 that operates by being fed from another power supply system 30. In this way, position detection device 111 secures the fail-safe even against any failure of magnetic sensor 11 and power supply systems 30.

As described in the fifth and sixth exemplary embodiments, the position detection device according to the present invention can detect a position of the operating unit, which displaces between four positions or less, and can secure the fail-safe against failure of the power supply and the detector. It is possible to simplify a configuration of the position detection device, and to reduce overall dimensions of the position detection device, by setting one detection system and the other detection system to have an identical detection pattern when the shift lever is located at an identical position.

Incidentally, when position detection devices 1G, 1H in the fifth and sixth exemplary embodiments are compared with each other, position detection device 1G according to the fifth exemplary embodiment does not include a detection pattern in which all magnetic sensors 11 turn OFF, but position detection device 1H according to the sixth exemplary embodiment includes this detection pattern. Herein, as a case where all magnetic sensors 11 in position detection device 1H according to the sixth exemplary embodiment indicate OFF, two states can be considered. Those two states includes a first state in which all magnetic sensors 11 that are normal indicate OFF, and a second state in which part of or all magnetic sensors 11 get, for example, failure (indicate OFF), and as a result, all magnetic sensors 11 indicate OFF. To distinguish those two states from each other, it is necessary that presence of failures in all magnetic sensors 11 can be detected. Accordingly, position detection device 1G according to the fifth exemplary embodiment does not need such a configuration, and therefore is more excellent than position detection device 1H according to the sixth exemplary embodiment.

Note that, in the above description, a case where magnetic sensors 11 are used to configure the detector, but the configuration of the detector is not limited to magnetic sensors 11. The detector may be configured by using a contact sensor that detects presence of physical contact or an optical sensor that detects presence of light reception, or may further be configured by using sensors of other types. The position detection device according to the present invention is not limited to the aspects illustrated in the fifth to sixth exemplary embodiments. The disposition pattern of the magnetic sensors and the magnets can adopt other layouts.

Seventh Exemplary Embodiment

In a position detection device according to an seventh exemplary embodiment of the present invention, each of detection systems 12A, 12B includes three magnetic sensors 11 each of which has a detection function with one bit that outputs any one of two values (ON, OFF) that varies according to a positional relationship with permanent magnet 21. This enables output of a detection pattern with three digits.

With respect to three predetermined positions (for example, positions P, N, S) among five positions, which are common in two detection systems 12A, 12B, even ire a detection pattern in any detection system and any position, an output value of a certain digit and output values of the other two digits among three digits included in the detection pattern are set to be different from each other. Moreover, in one detection system, detection patterns corresponding to the three positions are set to be different from each other.

With respect to two predetermined positions (for example, positions R, D) among five positions, which are common in two detection systems 12A, 12B, even in a detection pattern in any detection system and at any position, three digits in the detection pattern are set to have an identical output value, and two detection patterns belonging to one detection system and respectively corresponding to different positions are set to be different from each other. Two detection patterns respectively belonging to different detection systems and corresponding to an identical position are also set to be different from each other.

[Dispositions of Sensors and Magnets]

Hereinafter, disposition forms of magnetic sensors 11 and permanent magnets 21 included in such position detection device 1 will be specifically exemplified and described.

Figure 17:
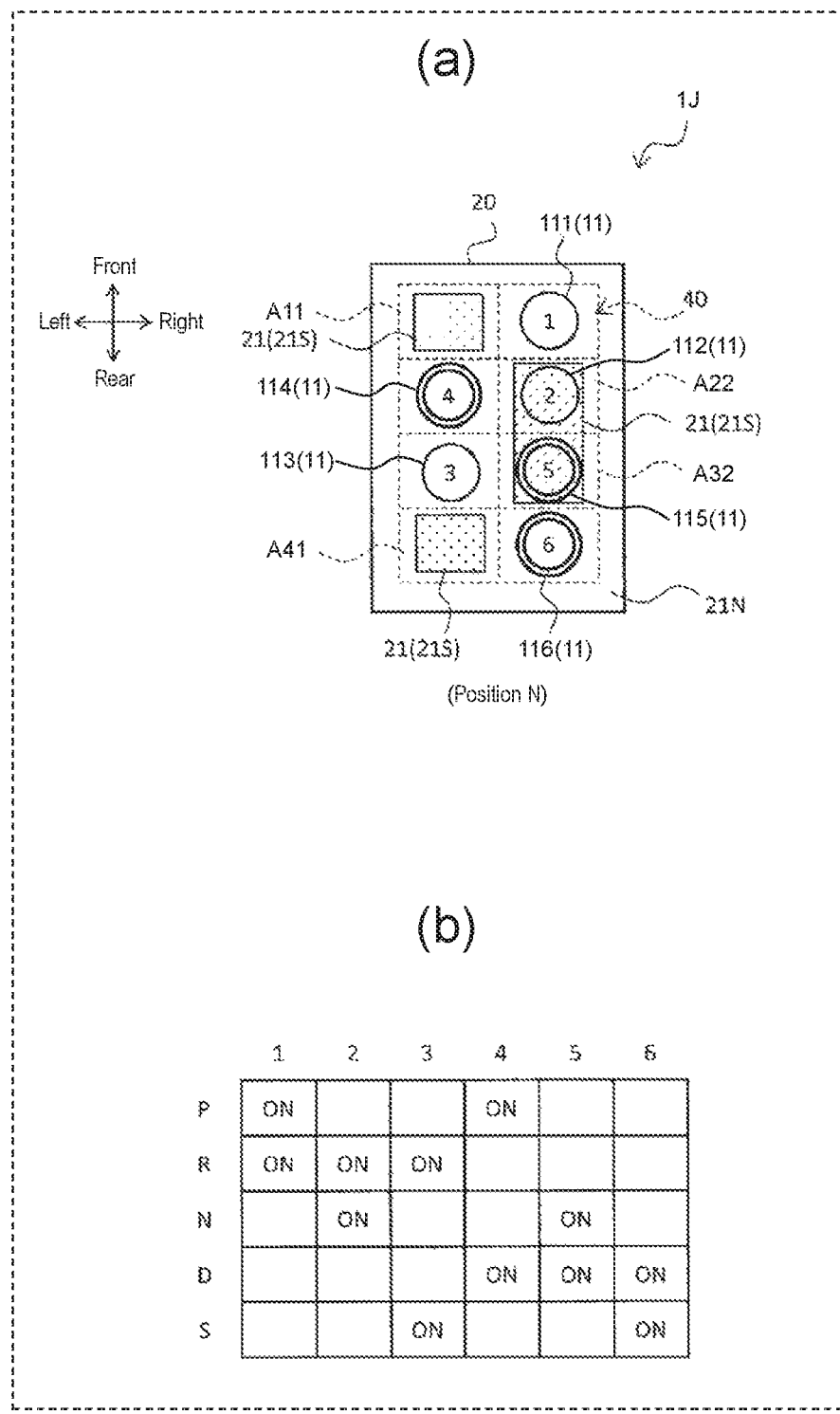
FIG. 17 illustrates a configuration of the position detection device (part (a)), and a table illustrating its detection patterns (part (b)).

Part (a) of FIG. 17 is a schematic diagram illustrating a configuration of position detection device 1J according to the seventh exemplary embodiment, and particularly illustrates dispositions of magnetic sensors 11 and permanent magnets 21, when shift lever 101 is located at position N. Note that icons attached with FIGS. 1 to 3 in single circles respectively represent first to third magnetic sensors "111 to 113" in first detection system 12A, and icons attached with FIGS. 4 to 6 in double circles respectively represent fourth to sixth magnetic sensors "114 to 116" in second detection system 12B.

For convenience of description, matrix 40 of four rows and two columns will be assumed, matrix 40 being configured with four rows aligned in the front-back direction and two columns aligned in the right-left direction (refer to part (a) of FIG. 17). In matrix 40, a position of a certain box located at row m and column is denoted as (m, n).

In this case, magnetic sensors 11 when shift lever 101 is located at position N are disposed as follows. Specifically, first magnetic sensor 111 in first detection system 12A is located at (1, 2). Second magnetic sensor 112 in first detection system 12A is located at (2, 2). Third magnetic sensor 113 in first detection system 12A is located at (3, 1). Further, fourth magnetic sensor 114 in second detection system 12B is located at (2, 1). Fifth magnetic sensor 115 in second detection system 12B is located at (3, 2). Sixth magnetic sensor 116 in second detection system 12B is located at (4, 2). No magnetic sensor 11 is disposed at remaining positions (1, 1) and (1, 4) in matrix 40.

Note that each magnetic sensor 11 is configured with, for example, a Hall IC, and has a detection function with one bit that outputs one of two values according to a positional relationship with permanent magnet 21, as described above. Specifically, each magnetic sensor 11 configured to detect the S pole outputs an ON signal when facing the S pole, and outputs an OFF signal when not facing the S pole. Note that each magnetic sensor 11 may be configured to detect the N pole.

On the other hand, permanent magnets 21 are disposed on a lower surface of supporter 20 with a predetermined pattern. In other words, S poles 21S of the permanent magnet are disposed in box regions at positions (1, 1), (2, 2), (3, 2), and (4, 1) in matrix 40. Hereinafter, any region is denoted as "region A", and a specific box region located at (m, n) is denoted as "Amn". Accordingly, S poles 21S of the permanent magnet illustrated in part (a) of FIG. 17 are disposed in regions A11, A22, A32, A41. S poles 21S of the permanent magnet in regions A22, A32 that are adjacent to each other in the front-back direction are integrally formed.

Note that a non-magnetic body having no magnetism may configure other region A12, A21, A31, A42 excluding regions A11, A22, A32, A41 provided with S poles 21S of the permanent magnet. It should be noted that, in the seventh exemplary embodiment, N pole 21N of the permanent magnet is provided at other regions A described above to facilitate detection of magnetism of S poles 21S by magnetic sensors 11, in order to clarify a border between regions A provided with S poles 21S of the permanent magnet and other regions A. In part (a) of FIG. 17, each S pole 21S of the permanent magnet having a rectangular shape to meet a shape of region A at which this S pole 21S is located is exemplified. However, each S pole 21S of the permanent magnet may adopt other shapes.

[Operation of Position Detection Device]

Figure 18:
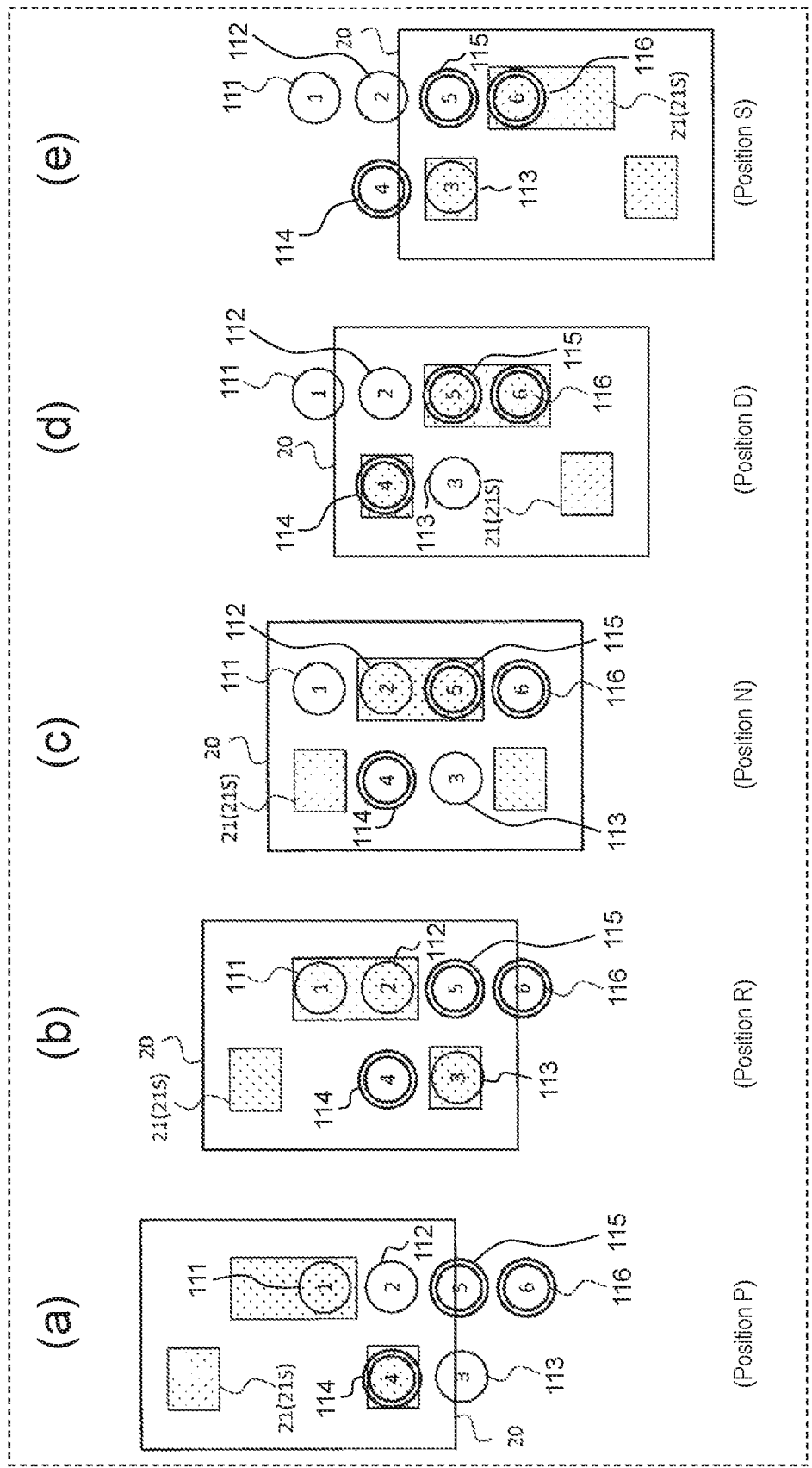
FIG. 18 is a schematic diagram of states of a position detection device according to a seventh exemplary embodiment, when an operating unit is located at each position.

With reference to FIG. 18, detection patterns when shift lever 101 is located at respective positions will be described.

In a case of position P in part (a) of FIG. 18, first magnetic sensor 111 faces S pole of the permanent magnet in region A32, and fourth magnetic sensor 114 faces S pole 21S of the permanent magnet in region A41. In contrast, four other magnetic sensors 11 do not face S pole 21S of the permanent magnet. Accordingly, in the detection pattern in this case, first and fourth magnetic sensors 111, 114 each output the ON signal, and other sensors each output the OFF signal, as illustrated in a row of a table in part (b) of FIG. 17.

Note that, in a table illustrated in part (b) of FIG. 17, notations of P, R, N, D, S that are vertically aligned respectively indicate the live positions where shift lever 101 is located. Notations of 1 to 6 that are horizontally aligned respectively indicate first to sixth magnetic sensors "111 to 116". Each box in the table denotes a content of the signal (ON or OFF) output from corresponding magnetic sensor 11 at a corresponding position. Note that, for convenience of visibility, only "ON" is denoted, whereas "OFF" is not denoted in the table.

In a case of position R in part (b) of FIG. 18, first magnetic sensor 111 faces S pole 21S of the permanent magnet in A22, second magnetic sensor 112 faces S pole 21S of the permanent magnet in region A32, and third magnetic sensor 113 faces S pole 21S of the permanent magnet in region A41. In contrast, three other magnetic sensors 11 do not face S pole 21S of the permanent magnet. Accordingly, in a detection pattern in this case, first to third magnetic sensors "111 to 113" each output the ON signal, and other sensors each output the OFF signal, as illustrated in a second row of the table in part b) of FIG. 17.

In a case of position N in part (c) of FIG. 18, second magnetic sensor 112 faces S pole 21S of the permanent magnet in region A22, and fifth magnetic sensor 115 faces S pole 21S of the permanent magnet in region A32. In contrast, four other magnetic sensors 11 do not face S pole 21S of the permanent magnet. Accordingly, in a detection pattern in this case, second and fifth magnetic sensors 112, 115 each output the ON signal, and other sensors each output the OFF signal, as illustrated in a third row of the table in part (b) of FIG. 17.

In a case of position D in part (d) of FIG. 18, fourth magnetic sensor 114 faces S pole 21S of the permanent magnet in region A11, fifth magnetic sensor 115 faces S pole 21S of the permanent magnet in region A22, and sixth magnetic sensor 116 faces S pole 21S of the permanent magnet in region A32. In contrast, three other magnetic sensors 11 do not face S pole 21S of the permanent magnet. Accordingly, in a detection pattern in this case, fourth to sixth magnetic sensors "114 to 116" each output the ON signal, and other sensors each output the OFF signal, as illustrated in a fourth row of the table in part (b) of FIG. 17.

Finally, in a case of position S in part (e) of FIG. 18, third magnetic sensor 113 faces S pole 21S of the permanent magnet in region A11, and sixth magnetic sensor 116 faces S pole 21S of the permanent magnet in region A22. In contrast, four other magnetic sensors 11 do not face S pole 21S of the permanent magnet. Accordingly, in a detection pattern in this case, third and sixth magnetic sensors 113, 116 each output the ON signal, and other sensors each output the OFF signal, as illustrated in a fifth row of the table in part (b) of FIG. 17.

[Actions and Effects]

In position detection device 1J described above, each of detection systems 12A, 12B outputs different detection pattern for each position (refer to part (b) of FIG. 17). Accordingly, even if any one of power supply systems 30 causes failure, and detection system 12 corresponding to this power supply system 30 stops outputting the signal, the detection signal from another detection system 12 enables position detection of shift lever 101. In other words, fail-safe against failure of the power supply system can be secured.

Position detection device 1J thus configured can secure a humming distance of "3" or more as a whole. Accordingly, an error with two digits can be detected, and an error with one digit can be corrected.

Figures 19, 20:
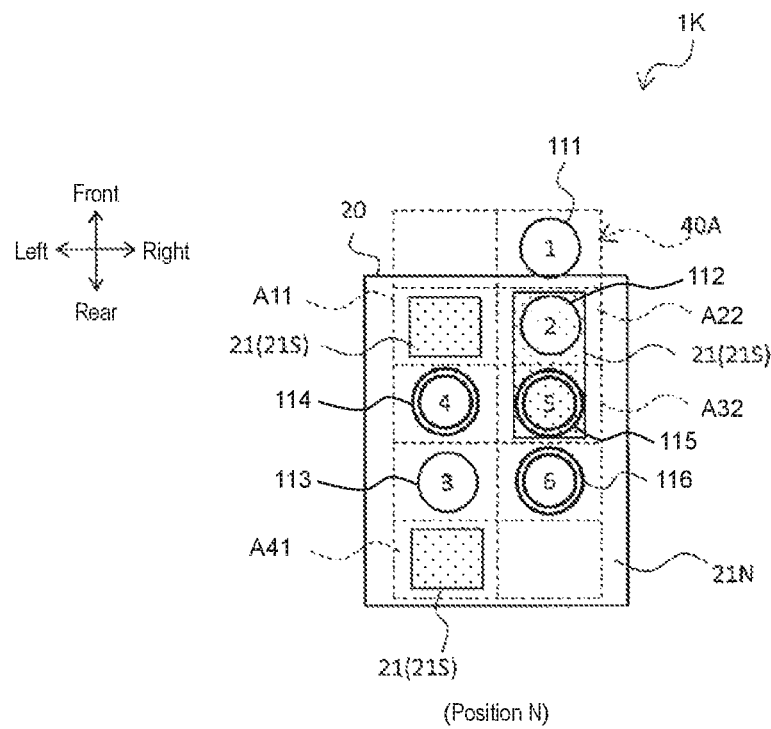
FIG. 19 is a table of humming distances between respective positions.
FIG. 20 is a schematic diagram of a configuration of a position detection device according to an eighth exemplary embodiment.

FIG. 19 is a table illustrating the humming distances between respective positions.

For example, in position detection device 1J according to the present exemplary embodiment, when a detection pattern at position P and a detection pattern at position R are compared, outputs from first magnetic sensor 111 coincide with each other (both are ON), and outputs from fifth and sixth magnetic sensors 11 also coincide with each other (all are OFF). Outputs from other magnetic sensors 11 at position P are different from outputs from other magnetic sensors 11 at position R. Accordingly, the humming distance between position P and position R is equal to "3".

As illustrated in FIG. 19, position detection device 1J according to the seventh exemplary embodiment secures the humming distance of "3" or more as a whole. Accordingly, for the error detection, t=2 is satisfied, and therefore errors in the output can be detected up to 2 pieces. For the error correction, t=1 is satisfied, and therefore one error in the output can be corrected. In this way, position detection device 1J secures the fail-safe even against failure of magnetic sensor 11.

Eighth Exemplary Embodiment

A position detection device according to an eighth exemplary embodiment will be described, which is applicable to the shift device illustrated in FIG. 1. FIG. 20 is a schematic diagram illustrating a configuration of position detection device 1K according to the eighth exemplary embodiment, and particularly illustrates dispositions of magnetic sensors 11 and permanent magnets 21, when shift lever 101 is located at position N. For convenience of description, matrix 40A of five rows and two columns will be assumed, matrix 40A being figured with five rows aligned in the front-back direction and two columns aligned in the right-left direction.

In this case, magnetic sensors 11 when shift lever 101 is located at position N are disposed as follows. Specifically, first magnetic sensor 111 in first detection system 12A is located at (1, 2). Second magnetic sensor 112 in first detection system 12A is located at (2, 2). Third magnetic sensor 113 in first detection system 12A is located at (4, 1). Further, fourth magnetic sensor 114 in second detection system 12B is located at (3, 1). Fifth magnetic sensor 115 in second detection system 12B is located at (3, 2). Sixth magnetic sensor 116 in second detection system 12B is located at (4, 2). No magnetic sensor 11 is disposed at remaining positions in matrix 40A.

On the other hand, S poles 21S of the permanent magnet are provided in regions A21, A22, A32, A51 of matrix 40A, on a lower surface of supporter 20. Note that S poles 21S of the permanent magnet in regions A22, A32 that are adjacent to each other in the front-back direction are integrally formed. N poles 21N of the permanent magnet are provided in other regions A, but those other regions A in supporter 20 may be configured with a non-magnetic body.

Figure 21:
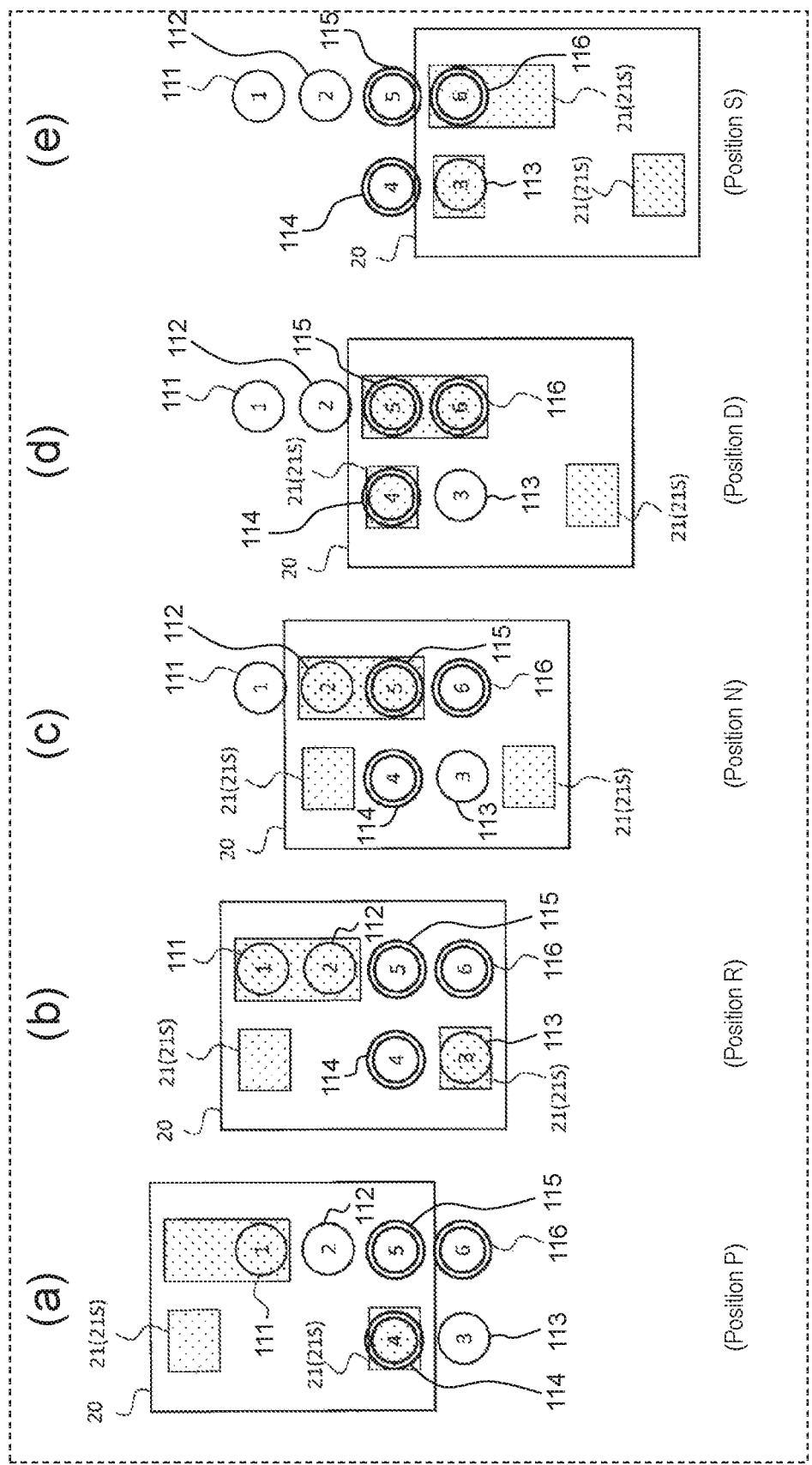
FIG. 21 is a schematic diagram of states of the position detection device of the eighth exemplary embodiment, when an operating unit is located at each position.

With reference to FIG. 21, detection patterns when shift lever 101 is located at respective positions will be described.

In a case of position P in part (a) of FIG. 21, first magnetic sensor 111 faces S pole 21S of the permanent magnet in region A32, and fourth magnetic sensor 114 faces S pole 21S of the permanent magnet in region A51. In a case of position in part (b) of FIG. 21, first magnetic sensor 111 faces S pole 21S of the permanent magnet in region A22, second magnetic sensor 112 faces S pole 21S of the permanent magnet in region A32, and third magnetic sensor 113 faces S pole 21S of the permanent magnet in region A51.

In a case of position N in part (c) of second magnetic sensor 112 faces S pole 21S of the permanent magnet in region A22, and fifth magnetic sensor 115 faces S pole 21S of the permanent magnet in region A32. In a case of position D in part (d) of FIG. 21, fourth magnetic sensor 114 faces S pole 21S of the permanent magnet in region A21, fifth magnetic sensor 115 faces S pole 21S of the permanent magnet in region A22, and sixth magnetic sensor 116 faces S pole 21S of the permanent magnet in region A32.

Finally, in a case of position S in part (e) of FIG. 21, third magnetic sensor 113 faces S pole 21S of the permanent magnet in region A21, and sixth magnetic sensor 116 faces S pole 21S of the permanent magnet in region A22. Note that magnetic sensors 11 that are not mentioned in the above description for parts (a) to (e) of FIG. 21 do not face S pole 21S of the permanent magnet.

As a result, the detection patterns at respective positions are configured to be entirely equal to the detection patterns illustrated in part (b) of FIG. 17 described in the seventh exemplary embodiment. Accordingly, the humming distances between respective positions are also configured to be entirely equal to the humming distances in FIG. 19 described in the seventh exemplary embodiment. Therefore, position detection device 1K according to the eighth exemplary embodiment also exerts the actions and effects similar to those of position detection device 1J according to the seventh exemplary embodiment.

Ninth Exemplary Embodiment

In the seventh and eighth exemplary embodiments, the position detection device applied to shift device 100 that can displace shift lever 101 only in one direction (front-back direction) is exemplified, but an application target of the present invention is not limited to this shift device 100. For example, the present invention is also applicable to a shift device that can displace shift lever 101 in a predetermined direction (for example, the front-back direction) and a direction that intersects with the predetermined direction (for example, a right-left direction). In a ninth exemplary embodiment, a position detection device applicable to a shift device that can displace shift lever 101 in two directions (the front-back direction and the right-left direction) will be described.

Figure 22:
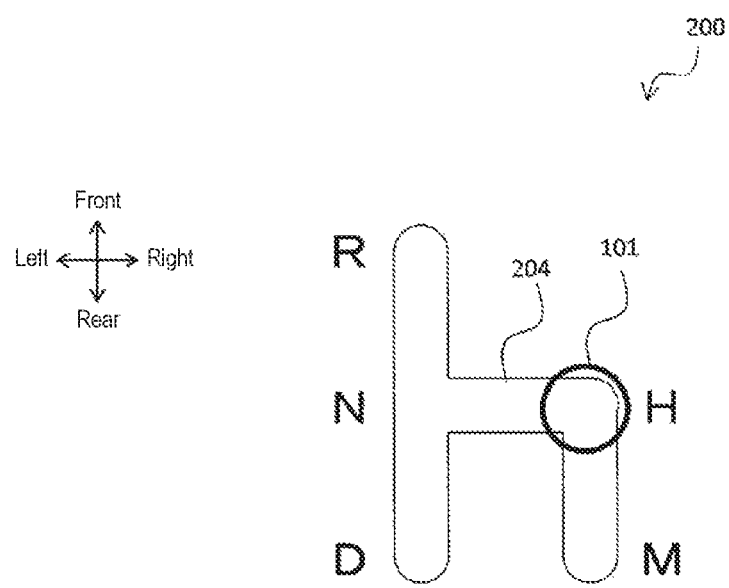
FIG. 22 is a schematic diagram illustrating a displacement mode of a shift lever in a shift device according to a ninth exemplary embodiment.

FIG. 22 is a schematic diagram illustrating a displacement mode of shift lever 101 in shift device 200 according to the ninth exemplary embodiment. As illustrated, in shift device 200, the displacement can be achieved between five positions that are position R, position N, position D, position H, and position M along guide groove 204. Among those positions, three positions that are position R, position N, and position D are disposed from the front toward the rear in this order. On the other hand, position 11 is disposed on a right side of position N, and shift lever 101 at position N is displaced rightward, to select position H. Position M is disposed on behind position H, and position M can be selected only by displacing shift lever 101 at position rearward.

Figure 23:
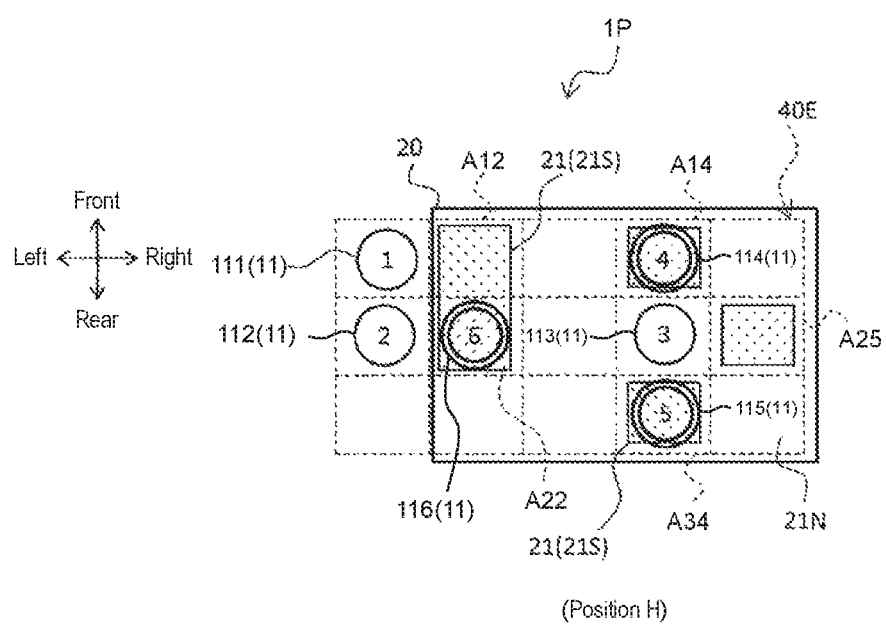
FIG. 23 is a schematic diagram of a configuration of a position detection device according to the ninth exemplary embodiment.

FIG. 23 is a schematic diagram illustrating configuration of position detection device 1P according to the ninth exemplary embodiment, and particularly illustrates dispositions of magnetic sensors 11 and permanent magnets 21, when shift lever 101 is located at position H. For convenience of description, matrix 40E of three rows and five columns will be assumed, matrix 40E being configured with three rows aligned in the front-back direction and five columns aligned in the right-left direction.

In this case, magnetic sensors 11 when shift lever 101 is located at position H are disposed as follows. Specifically, first magnetic sensor 111 in first detection system 12A is located at (1, 1). Second magnetic sensor 112 in first detection system 12A is located at (2, 1). Third magnetic sensor 113 in first detection system 12A is located at (2, 4). Further, fourth magnetic sensor 114 in second detection system 12B is located at (1, 4). Fifth magnetic sensor 115 in second detection system 12B is located at (3, 4). Sixth magnetic sensor 116 in second detection system 12B is located at (2, 2). No magnetic sensor is disposed at remaining positions in matrix 40E.

On the other hand, S poles 21S of the permanent magnet are provided in regions A12, A14, A22, A25, A34 of matrix 40E, on a lower surface of supporter 20. Note that S poles 21S of the permanent magnet in regions A12, A22 that are adjacent to each other in the front-back direction are integrally formed. N poles 21N of the permanent magnet are provided in other regions A, but those other regions A in supporter 20 may be configured with a non-magnetic body.

Figure 24:
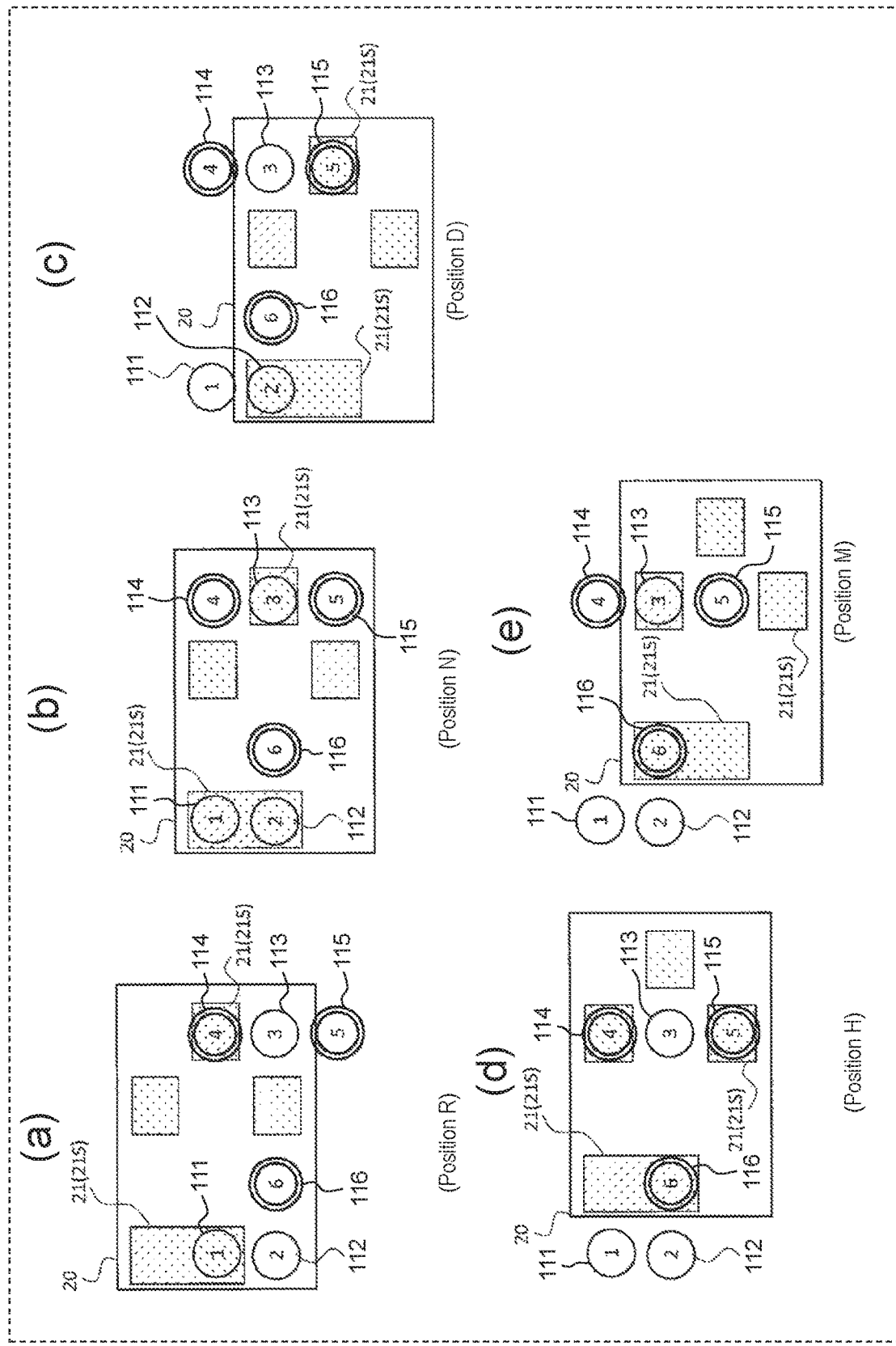
FIG. 24 is a schematic diagram of states of the position detection device of the ninth exemplary embodiment, when an operating unit is located at each position.

With reference to FIG. 24, detection patterns when shift lever 101 is located at respective positions will be described.

In a case of position R in part (a) of FIG. 24, first magnetic sensor 111 faces S pole 21S of the permanent magnet in region A22, and fourth magnetic sensor 114 faces S pole 21S of the permanent magnet in region A25. In a case of position N in part (b) of FIG. 24, first magnetic sensor 111 faces S pole 21S of the permanent magnet in region A12 second magnetic sensor 112 faces pole 21S of the permanent magnet in region A22, and third magnetic sensor 113 faces S pole 21S of the permanent magnet in region A25.

In a case of position D in par (c) of FIG. 24, second magnetic sensor 112 faces S pole 21S of the permanent magnet in region A12, and fifth magnetic sensor 115 faces S pole 21S of the permanent magnet in region A25. In a case of position H in part (d) of FIG. 24, fourth magnetic sensor 114 faces pole 21S of the permanent magnet in region A14, fifth magnetic sensor 115 faces S pole 21S of the permanent magnet in region A34, and sixth magnetic sensor 116 faces S pole 21S of the permanent magnet in region A22.

Finally, in a case of position S in part (e) of FIG. 24, third magnetic sensor 113 faces S pole 21S of the permanent magnet in region A14, and sixth magnetic sensor 116 faces S pole 21S of the permanent magnet in region A12. Note that magnetic sensors 11 that are not mentioned in the above description for parts (a) to (e) of FIG. 24 do not face S pole 21S of the permanent magnet.

Consequently, with replacing positions R, N, D, H, and M with positions P, R, N, D, and S, detection patterns at respective positions are entirely equal to the detection patterns in part (b) of FIG. 17 described in the seventh exemplary embodiment. Accordingly, the humming distances between respective positions are also configured to be entirely equal to the humming distances FIG. 19 described in the seventh exemplary embodiment. Therefore, position detection device 1P according to the ninth exemplary embodiment also exerts the actions and effects similar to those of position detection device 1J according to the seventh exemplary embodiment.

Tenth Exemplary Embodiment

Figure 25:
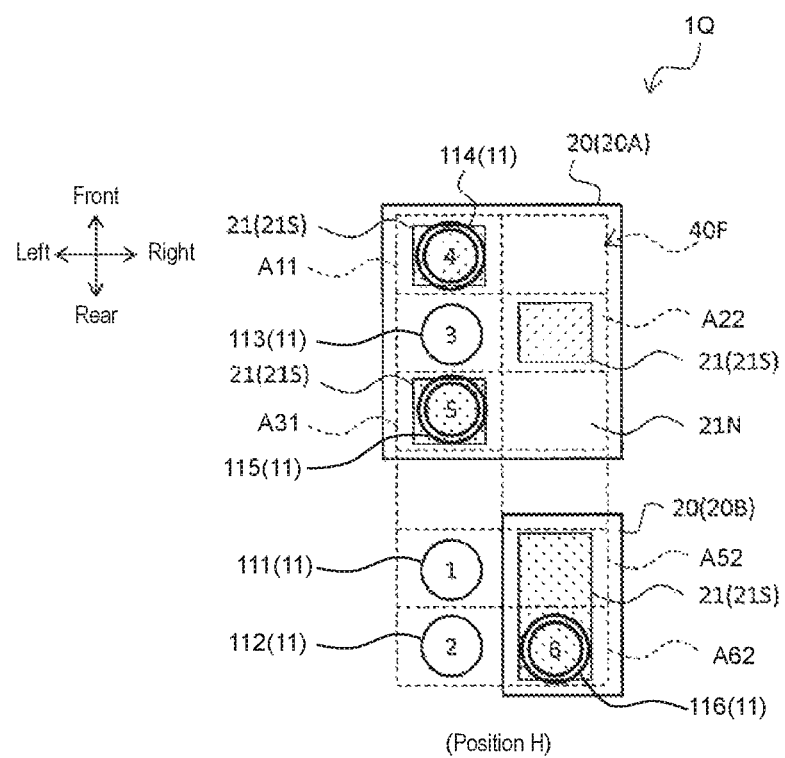
FIG. 25 is a schematic diagram of a configuration of a position detection device according to a tenth exemplary embodiment.

A position detection device according to a tenth exemplary embodiment, which is applicable to the shift device illustrated in FIG. 22, will be described. FIG. 25 is a schematic diagram illustrating a configuration of position detection device 1Q according to the tenth exemplary embodiment, and particularly illustrates dispositions of magnetic sensors 11 and permanent magnets 21, when shift lever 101 is located at position H. For convenience of description, matrix 40F of six rows and two columns will be assumed, matrix 40F being configured with six rows aligned in the front-back direction and two columns aligned in the right-left direction.

In this case, magnetic sensors 11 when shift lever 101 is located at position H are disposed as follows. Specifically, first magnetic sensor 111 in first detection system 12A is located at (5, 1). Second magnetic sensor 112 in first detection system 12A is located at (6, 1). Third magnetic sensor 113 in first detection system 12A is located at (2, 1). Further, fourth magnetic sensor 114 in second detection system 12B is located at (1, 1). Fifth magnetic sensor 115 in second detection system 12B is located at (3, 1). Sixth magnetic sensor 116 in second detection system 12B is located at (6, 2). No magnetic sensor is disposed at remaining positions in matrix 40F.

On the other hand, S poles 21S of the permanent magnet are provided in regions A11, A22, A31, A52, A62 of matrix 40F, on a lower surface of supporter 20. Note that S poles 21S of the permanent magnet in regions A52, A62 that are adjacent to each other in the front-back direction are integrally formed. N poles 21N of the permanent magnet are provided in other regions A, but those other regions A in supporter 20 may be configured with a non-magnetic body. As understood from FIG. 25, position detection device 1Q according to the tenth exemplary embodiment is configured by dividing supporter 20 into two supporters 20A, 20B. S poles 21S of the permanent magnet at regions A11, A22, A31 are provided in supporter 20A, and S poles 21S of the permanent magnet at regions A52, A62 are provided in supporter 20B.

Figure 26:
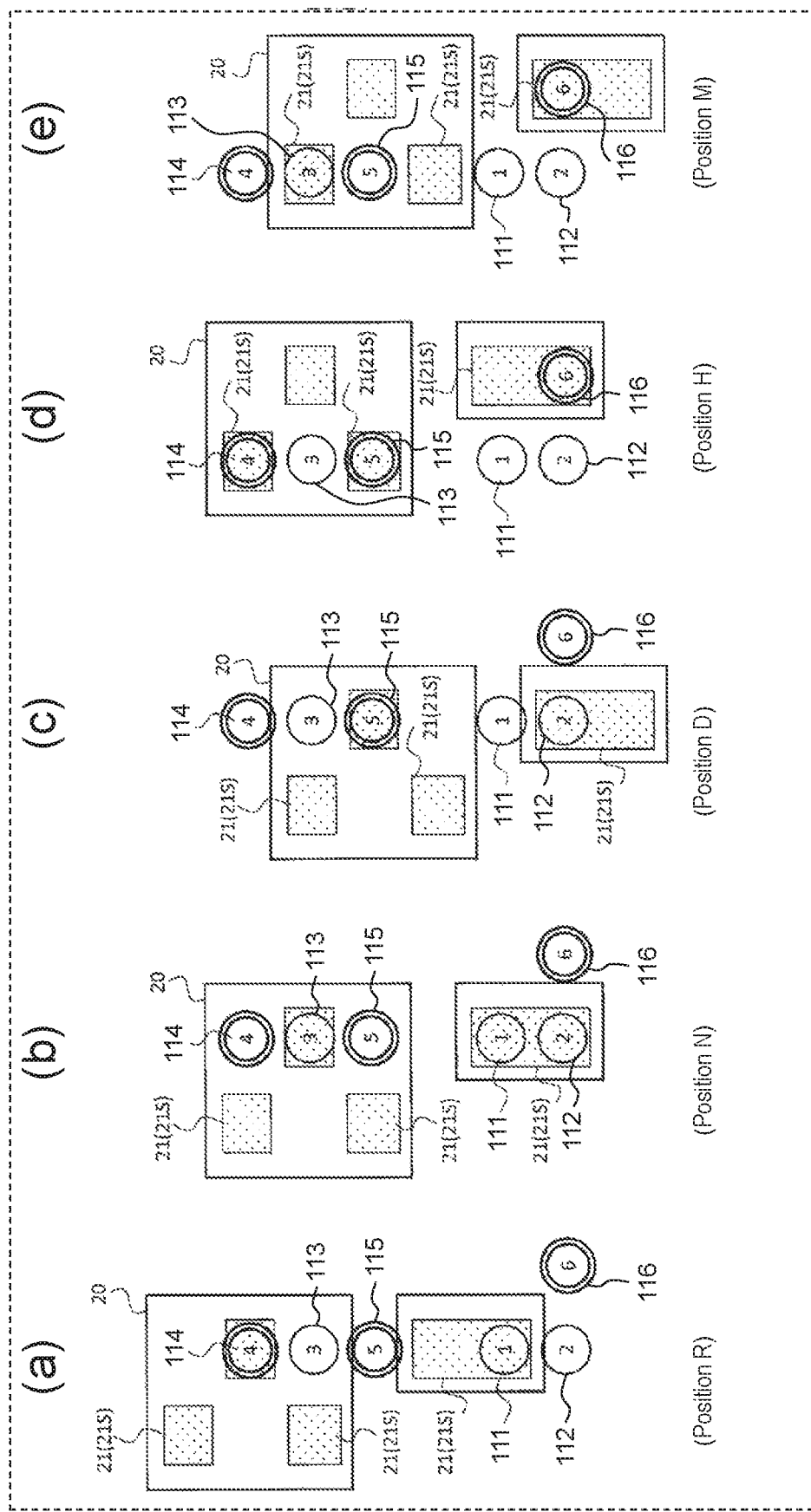
FIG. 26 is a schematic diagram of states of the position detection device of the tenth exemplary embodiment, when an operating unit is located at each position.

With reference to FIG. 26, detection patterns when shift lever 101 is located at respective positions will be described.

In a case of position R in part (a) of FIG. 26, first magnetic sensor 111 faces S pole 21S of the permanent magnet in region A62, and fourth magnetic sensor 114 faces S pole 21S of the permanent magnet in region A22. In a case of position N in part (b) of FIG. 26, first magnetic sensor 111 faces S pole 21S of the permanent magnet in region A52, second magnetic sensor 112 faces S pole 21S of the permanent magnet in region A62, and third magnetic sensor 113 faces S pole 21S of the permanent magnet in region A22.

In a case of position D in part (c) of FIG. 26, second magnetic sensor 112 faces S pole 21S of the permanent magnet in region A52, and fifth magnetic sensor 115 faces S pole 21S of the permanent magnet in region A22. In a case of position H in part (d) of FIG. 26, fourth magnetic sensor 114 faces S pole 21S of the permanent magnet in region A11, fifth magnetic sensor 115 faces S pole 21S of the permanent magnet in region A31, and sixth magnetic sensor 116 faces S pole 21S of the permanent magnet in region A62.

Finally, in a case of position S in part (e) of FIG. 26, third magnetic sensor 113 faces S pole 21S of the permanent magnet in region A11, and sixth magnetic sensor 116 faces S pole 21S of the permanent magnet in region A52. Note that magnetic sensors 11 that are not mentioned in the above description for parts (a) to (e) of FIG. 26 do not face S pole 21S of the permanent magnet.

Consequently, with replacing positions R, N, D, H, and M with positions P, R, N, D, and S, detection patterns at respective positions are entirely equal to the detection patterns in part (b) of FIG. 17 described in the seventh exemplary embodiment. Accordingly, the humming distances between respective positions are also configured to be entirely equal to the humming distances in FIG. 19 described in the seventh exemplary embodiment. Therefore, position detection device 1Q according to the tenth exemplary embodiment also exerts the actions and effects similar to those of position detection device 1J according to the seventh exemplary embodiment.

Note that, in the above description, a case where magnetic sensors 11 are used to configure the detector, but the configuration of the detector is not limited to magnetic sensors 11. The detector may be configured by using a contact sensor that detects presence of physical contact or an optical sensor that detects presence of light reception, or may further be configured by using sensors of other types.

The position detection device according to the present invention is not limited to the aspects illustrated in the seventh to tenth exemplary embodiments. The disposition pattern of the magnetic sensors and the magnets can adopt other layouts.

For example, a layout of magnetic sensors 11 and permanent magnets 21 may be set so as to form detection patterns in which order of a pattern (ON, OFF, OFF) at position P, a pattern (OFF, ON, OFF) at position N, and a pattern (OFF, OFF, ON) at position S is freely changed, among detection patterns from first to third magnetic sensors "111 to 113" illustrated in part (b) of FIG. 17. Alternatively, the layout of magnetic sensors 11 and permanent magnets 21 may be set so as to form detection patterns in which order of a pattern at position P, a pattern at position N, and a pattern at position S is freely changed, among detection patterns from fourth to sixth magnetic sensors "114 to 116". Furthermore, the detection patterns may be set such that, among detection patterns of first to sixth magnetic sensors "111 to 116", each of the ONs and the OFFs in detection values for position R and position D may be replaced to the other value.

In the above description, a configuration in which first detection system 12A and second detection system 12B are disposed adjacent to each other is exemplified, but the present invention is not limited to this configuration. For example, as long as the detection patterns are configured to change along with the displacement of shift lever 101, first detection system 12A and second detection system 12B may be disposed while being spatially separated from each other.

Figure 27:
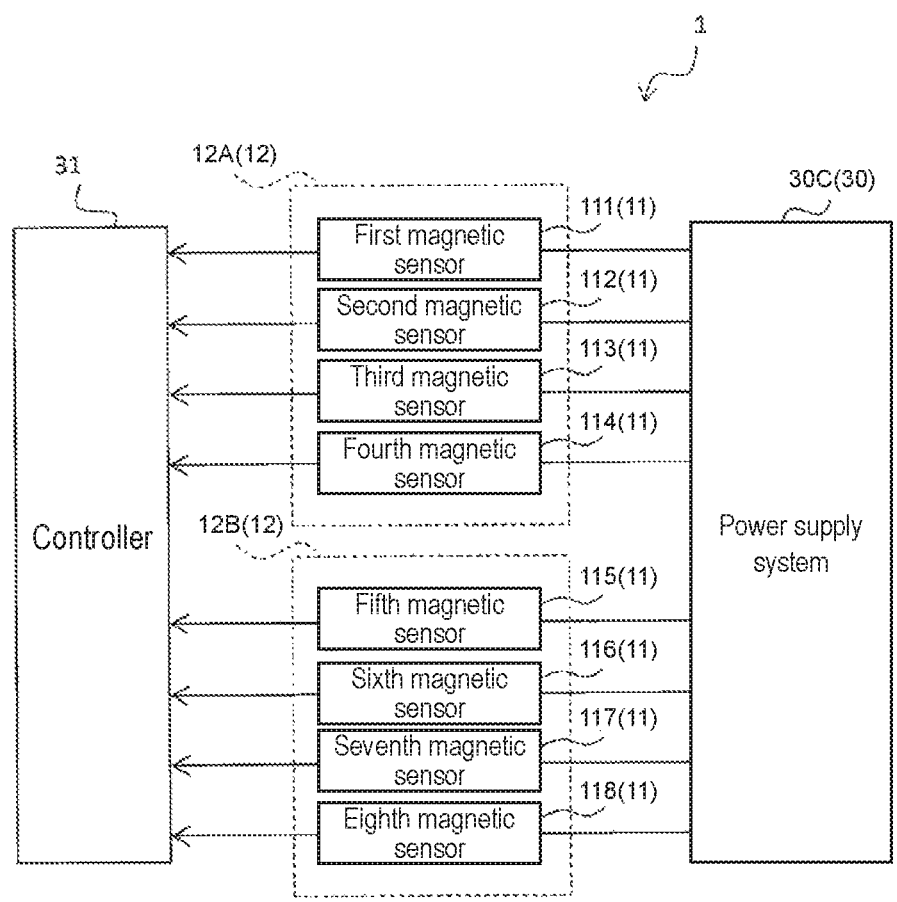
FIG. 27 is a block diagram illustrating a modification of an electrical configuration of the position detection device.

In the above description, although first detection system 12A and second detection system 12B are supplied with power from power supply systems 30A and 30B different from each other, as shown in FIG. 27, first detection system 12A and second detection system 12B may be connected to a single power supply system 30C to be supplied with power.

At this time, although the fail safe for the failure of the power supply can not be ensured, the fail safe for the failure of the magnetic sensor 11 can be ensured.

INDUSTRIAL APPLICABILITY

The present invention is applicable to, for example, a position detection device for a shift device to be operated by a driver a vehicle such as an automobile.

REFERENCE MARKS IN THE DRAWINGS 1 position detection device
1A position detection device
1A1 position detection device
1A2 position detection device
1A3 position detection device
1A4 position detection device
1B position detection device
1C position detection device
1E position detection device
1F position detection device
1G position detection device
1H position detection device
1J position detection device
1K position detection device
1P position detection device
1Q position detection device
11 magnetic sensor
111 first magnetic sensor
112 second magnetic sensor
113 third magnetic sensor
114 fourth magnetic sensor
115 fifth magnetic sensor
116 sixth magnetic sensor
117 seventh magnetic sensor
118 eighth magnetic sensor
10 board
12 detection system
12A first detection system
12B second detection system
20 supporter
20A supporter
20B supporter
21 permanent magnet
30 power supply system
30A first power supply system
30B second power supply system
31 controller
100 shift device
101 shift lever (operating unit)
102 detection unit
103 shift panel
104 guide groove
200 shift device
204 guide groove

The invention claimed is:
1. A position detection device that detects a plurality of five positions of an operating unit, the position detection device comprising:
a detection target unit displaceable along with the operating unit between the plurality of five positions;

a first detection system and a second detection system that are distinct from each other, the first and second detection systems are powered by one or more power supply systems, and the first and second detection systems are stationary relative to the operating unit and the detection target unit; and wherein the first detection system includes a first detector, a second detector, and a third detector, the first, second, and third detectors each have a detection function with one bit having a first value and a second value, each of the first, second, and third detectors are configured to output one of the first value or the second value in accordance with a positional relationship of the first, second, and third detectors, respectively, relative to the detection target unit, and the first detection system is configured to output a plurality of first detection patterns with three digits, each one of the plurality of first detection patterns is in accordance with one of the plurality of five positions, each one of the plurality of first detection patterns is based on the first or second values output by the first, second, and third detectors, respectively, when the detection target unit and the operating unit are in one of the plurality of five positions, wherein the second detection system includes a fourth detector, a fifth detector, and a sixth detector, the fourth, fifth, and sixth detectors each have a detection function with one bit having the first value and the second value, each of the fourth, fifth, and sixth detectors are configured to output one of the first value or the second value in accordance with a positional relationship of the fourth, fifth, and sixth detectors, respectively, relative to the detection target unit, and the second detection system is configured to output a plurality of second detection patterns with three digits, each one the plurality of second detection patterns is in accordance with one of the plurality of five positions, each one of the plurality of second detection patterns is based on the first or second values output by the fourth, fifth, and sixth detectors, respectively, when the operating unit and the detection target unit are in one of the plurality of five positions, wherein three predetermined positions among the plurality of five positions are common to the first detection system and the second detection system, in each of the three predetermined positions of the plurality of five positions one digit is set to be different from two other digits among the three digits in three respective first detection patterns of the plurality of first detection patterns, each one of the three respective first detection patterns of the plurality of first detection patterns corresponds to one of the three predetermined positions, and each one of the three respective first detection patterns of the plurality of first detection patterns is different from others of the three respective first detection patterns of the plurality of first detection patterns corresponding to the three predetermined positions, respectively, wherein in each of the three predetermined positions among the plurality of five positions one digit is set to be different from two other digits among the three digits in three respective second detection patterns of the plurality of second detection patterns, each one of the three respective second detection patterns of the plurality of second detection patterns corresponds to one of the three predetermined positions, and each one of the three respective second detection patterns of the plurality of second detection patterns is different from others of the three respective second detection patterns of the plurality of second detection patterns corresponding to the three predetermined positions, respectively, wherein two remaining predetermined positions among the plurality of five positions are common to the first detection system and the second detection system among the plurality of five positions, in each of the two remaining predetermined positions of the plurality of five positions the three digits of the plurality of first detection patterns are set to be identical to each other, each one of the two respective first detection patterns of the plurality of first detection patterns corresponds to one of the two remaining predetermined positions of the plurality of five positions, and the two respective first detection patterns of the plurality of first detection patterns corresponding to the two remaining predetermined positions are different from each other, wherein in each of the two remaining predetermined positions among the plurality of five positions the three digits of two respective second detection patterns of the plurality of second detection patterns are set to be identical to each other, each one of the two respective second detection patterns of the plurality of second detection patterns corresponds to one of the two remaining predetermined positions of the plurality of five positions, and the two respective second detection patterns of the plurality of second detection patterns corresponding to the two remaining predetermined positions are different from each other, and wherein in any of the two remaining predetermined positions of the plurality of five positions, a corresponding first detection pattern of the two respective first detection patterns of the plurality of first detection patterns is different from a corresponding second detection pattern of the two respective second detection patterns of the plurality of second detection patterns.

2. The position detection device according to claim 1, wherein the plurality of five positions are aligned in a line along a predetermined direction, the three predetermined positions among the plurality of five positions are located at a first position, a third position, and a fifth position in this order from one end of the plurality of five positions along the predetermined direction, and the two remaining predetermined positions among the plurality of five positions are located at a second position and a fourth position in this order from the one end of the plurality of five positions along the predetermined direction.

3. The position detection device according to claim 1, wherein the one or more power supplies includes a single power supply system that provides power to the first detection system and the second detection system.

4. The position detection device according to claim 3, wherein the plurality of five positions are aligned in a line along a predetermined direction, the three predetermined positions among the plurality of five positions are located at a first position, a third position, and a fifth position in this order from one end of the plurality of five positions along the predetermined direction, and the two remaining positions among the plurality of five positions are located at a second position and a fourth position in this order from the one end of the plurality of five positions along the predetermined direction.

5. The position detection device according to claim 1, wherein the one or more power supply systems includes a first power supply and a second power supply that are separate from each other;

the first, second, third, fourth, fifth, and sixth detectors are spaced apart by a fixed amount relative to each other;

the detection target unit includes:
- a first end and a second end opposite to the first end;
- a first permanent magnet closer to the first end than the second end;
- a second permanent magnet closer to the second end than the first end, the second permanent magnet spaced apart from the first permanent magnet; and
- a third permanent magnet offset relative to the first permanent magnet and the third permanent magnet, the third permanent magnet spaced apart from the first permanent magnet and the second permanent magnet;

the first detector, the second detector, and the third detector, respectively, are configured to, in operation, be overlapped by the first, second, and third permanent magnets, respectively, when the detection target unit is in a respective position of the plurality of five positions; and the fourth detector, the fifth detector, and the sixth detector, respectively, are configured to, in operation, be overlapped by the first, second, and third permanent magnets, respectively, when the detection target unit is in a respective position of the plurality of five positions.

6. The position detection device according to claim 5, wherein the first power supply provides power to the first detection system and the second power supply provides power to the second detection system.

* * * * *